(12) United States Patent
Won et al.

(10) Patent No.: US 10,756,914 B2
(45) Date of Patent: Aug. 25, 2020

(54) BROADCAST RESOURCE CONGESTION CONTROL METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Sunghwan Won, Seoul (KR); Sangbum Kim, Suwon-si (KR); Soenghun Kim, Suwon-si (KR); Songyean Cho, Seoul (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 14/865,861

(22) Filed: Sep. 25, 2015

(65) Prior Publication Data

US 2016/0094358 A1 Mar. 31, 2016

Related U.S. Application Data

(60) Provisional application No. 62/055,685, filed on Sep. 26, 2014, provisional application No. 62/073,163, filed on Oct. 31, 2014.

(51) Int. Cl.
*H04L 12/18* (2006.01)
*H04W 28/02* (2009.01)
(Continued)

(52) U.S. Cl.
CPC ........ *H04L 12/1886* (2013.01); *H04L 12/189* (2013.01); *H04L 12/1863* (2013.01);
(Continued)

(58) Field of Classification Search
CPC .. H04W 4/06; H04W 28/0289; H04W 72/005
See application file for complete search history.

(56) References Cited

U.S. PATENT DOCUMENTS

2008/0274759 A1    11/2008  Chen et al.
2010/0272004 A1*   10/2010  Maeda ................ H04L 5/0007
                                                        370/312
(Continued)

FOREIGN PATENT DOCUMENTS

EP          2 824 862 A2    1/2015
KR     10-2013-0049663 A    5/2013
(Continued)

OTHER PUBLICATIONS

R3-141836 3GPP WG3 #85 Background on RP-141035 Group Call eMBMS Congestion Management Motoroal Solutions Aug. 18-22, 2014.*

(Continued)

*Primary Examiner* — Jeffrey M Rutkowski
*Assistant Examiner* — Basil Ma
(74) *Attorney, Agent, or Firm* — Jefferson IP Law, LLP

(57) ABSTRACT

The present invention relates to a communication technology and system converging the fifth generation (5G) communication system for supporting a data rate higher than that of the 4G system with the IoT technology. Further, the present invention is applicable to the intelligent services based on the 5G communication and IoT technologies (e.g., smart home, smart building, smart city, smart car or connected car, health care, digital education, retail, security, and safety services). In more detail, a broadcast resource congestion control method of a multi-cell/multicast coordination entity (MCE) includes receiving a message including multimedia broadcast and multicast service (MBMS) congestion information from a base station, selecting an MBMS service to be controlled based on the MBMS congestion
(Continued)

information, and transmitting a scheduling message including first control information related to the selected MBMS service to the base station.

24 Claims, 21 Drawing Sheets

(51) Int. Cl.
*H04L 12/801* (2013.01)
*H04W 72/00* (2009.01)

(52) U.S. Cl.
CPC .......... *H04L 12/1881* (2013.01); *H04L 47/15* (2013.01); *H04W 28/0215* (2013.01); *H04W 28/0289* (2013.01); *H04W 72/005* (2013.01)

(56) References Cited

U.S. PATENT DOCUMENTS

| | | | |
|---|---|---|---|
| 2012/0287828 A1 | 11/2012 | Chen et al. | |
| 2013/0070660 A1* | 3/2013 | Xu | H04W 72/005 370/312 |
| 2013/0170357 A1* | 7/2013 | Anchan | H04L 65/4076 370/237 |
| 2013/0294320 A1* | 11/2013 | Jactat | H04L 12/189 370/312 |
| 2013/0343239 A1 | 12/2013 | Damnjanovic et al. | |
| 2014/0029484 A1 | 1/2014 | Choi et al. | |
| 2014/0112158 A1 | 4/2014 | Tavildar et al. | |
| 2014/0185539 A1 | 7/2014 | Seo et al. | |
| 2014/0192697 A1 | 7/2014 | Anchan et al. | |
| 2014/0233452 A1* | 8/2014 | Kim | H04L 12/1881 370/312 |
| 2014/0241220 A1 | 8/2014 | Choi et al. | |
| 2014/0269519 A1 | 9/2014 | Shan et al. | |
| 2014/0286224 A1 | 9/2014 | Yu et al. | |
| 2014/0348050 A1* | 11/2014 | Kim | H04L 5/0082 370/312 |
| 2014/0369242 A1 | 12/2014 | Ng et al. | |
| 2015/0016353 A1 | 1/2015 | Lee | |
| 2015/0124670 A1 | 5/2015 | Park | |
| 2015/0124686 A1* | 5/2015 | Zhang | H04W 76/40 370/312 |
| 2015/0146588 A1 | 5/2015 | Park | |
| 2015/0180676 A1* | 6/2015 | Bao | H04L 12/1886 370/230 |
| 2015/0200752 A1 | 7/2015 | Yin et al. | |
| 2015/0215903 A1 | 7/2015 | Zhao et al. | |
| 2016/0157081 A1 | 6/2016 | Kwak et al. | |
| 2016/0164653 A1 | 6/2016 | Wang et al. | |
| 2016/0242065 A1 | 8/2016 | Fukuta et al. | |
| 2016/0242152 A1 | 8/2016 | Yu et al. | |
| 2016/0242158 A1 | 8/2016 | Takeda et al. | |
| 2016/0269885 A1 | 9/2016 | Kim et al. | |
| 2016/0323846 A1* | 11/2016 | Park | H04W 4/08 |
| 2016/0366576 A1 | 12/2016 | You et al. | |
| 2016/0374050 A1* | 12/2016 | Prasad | H04W 4/06 |
| 2017/0230923 A1 | 8/2017 | Huang et al. | |
| 2017/0238149 A1* | 8/2017 | Xu | H04W 4/06 |
| 2017/0251341 A1* | 8/2017 | Frost | H04W 72/005 |

FOREIGN PATENT DOCUMENTS

| | | |
|---|---|---|
| KR | 10-2014-0108393 A | 9/2014 |
| KR | 10-2015-0048615 A | 5/2015 |
| WO | 2014/107607 A1 | 7/2014 |

OTHER PUBLICATIONS

RP-141035 3GPP TSG Meeting #64 Work Item: Group Call eMBMS congestion management Jun. 10-13, 2014.*
3GPP TS 36.443 V12.0.2 M2 Application Protocol Release 12 uploaded to portal.3gpp.org on Mar. 21, 2015 (Year: 2015).*
Huawei; Group Call eMBMS Congestion Management; 3GPP TSG-RAN WG3 Meeting #85; R3-141636; Aug. 18-22, 2014; Dresden, Germany.
Nokia Networks; Analysis on Group Call eMBMS congestion management; 3GPP TSG-RAN WG3 Meeting #85; R3-141659; Aug. 18-22, 2014; Dresden, Germany.
Vodafone et al.; Potential Solutions for "Group Call eMBMS Congestion Management"; 3GPP TSG RAN3 meeting #85; R3-141974; Aug. 18-22, 2014; Dresden, Germany.
LG Electronics et al., 'CR on HARQ-ACK transmission for TDD-FDD CA with eIMTA', R1-144511, 3GPP TSG-RAN WG1 Meeting #78bis, Ljubljana, Slovenia, Oct. 6-10, 2014.
LG Electronics, Considerations on HARQ-ACK and DCI for TDD-FDD CA, 3GPP TSG RAN WG1 Meeting #75, Nov. 11-15, 2013, R1-135464, XP050735137, San Francisco, USA.
LG Electronics, UCI for TDD-FDD Carrier Aggregation, 3GPP TSG RAN WG1 Meeting #76, Feb. 10-14, 2014, R1-140313, XP050735863, Prague, Czech Republic.
European Search Report dated Oct. 17, 2017, issued in the European Application No. 15855172.1-1854 / 3213427.
U.S. Office Action dated Apr. 17, 2018, issued in U.S. Appl. No. 15/327,360.
U.S. Office Action dated Dec. 20, 2018, issued in U.S. Appl. No. 15/327,360.
U.S. Office Action dated Jun. 13, 2019, issued in the U.S. Appl. No. 15/327,360.
U.S. Office Action dated Oct. 31, 2019, issued in the U.S. Appl. No. 15/327,360.
U.S. Notice of Allowance dated Mar. 17, 2020, issued in the U.S. Appl. No. 15/327,360.

* cited by examiner

| LCID 1 | Stop MTCH 1 | Oct 1 |
| Stop MTCH 1 | | Oct 2 |
| LCID 2 | Stop MTCH 2 | Oct 3 |
| Stop MTCH 2 | | Oct 4 |

. . .

| LCID n | Stop MTCH n | Oct 2n-1 |
| Stop MTCH n | | Oct 2n |
| LCID x | S x | Oct 2n+1 |

. . .

| LCID x+y | S x+y | Oct 2n+1+y |

BROADCAST RESOURCE CONGESTION CONTROL METHOD AND APPARATUS FOR USE IN WIRELESS COMMUNICATION SYSTEM

CROSS-REFERENCE TO RELATED APPLICATION(S)

This application claims the benefit under 35 U.S.C. § 119(e) of a U.S. Provisional application filed on Sep. 26, 2014 in the U.S. Patent and Trademark Office and assigned Ser. No. 62/055,685, and of a U.S. Provisional application filed on Oct. 31, 2014 in the U.S. Patent and Trademark Office and assigned Ser. No. 62/073,163, the entire disclosure of each of which is hereby incorporated by reference.

TECHNICAL FIELD

The present disclosure relates to a wireless communication system. More particularly, the present disclosure relates to a broadcast resource congestion control method and apparatus for use in a wireless communication system.

BACKGROUND

In order to meet the increasing wireless data traffic demand since the commercialization of 4G communication systems, the development focus is on the 5th Generation (5G) or pre-5G communication system. For this reason, the 5G or pre-5G communication system is called beyond 4G network communication system or post long term evolution (LTE) system. In order to accomplish a high data rate, it is considered to implement the 5G communication system on the millimeter Wave (mmWave) band (e.g., 60 GHz band). In order to mitigate propagation loss and increase propagation distance, the 5G communication system is likely to accommodate various techniques such as beamforming, massive multiple input and multiple output (MIMO), full dimensional MIMO (FD-MIMO), array antenna, analog beamforming, and large scale antenna. Also, for throughput enhancement of the 5G communication system, research is conducted on various techniques such as small cell, advanced small cell, cloud radio access network (cloud RAN), ultra-dense network, device to device Communication (D2D), wireless backhaul, moving network, cooperative communication, coordinated multi-points (CoMP), and interference cancellation. Furthermore, the ongoing research includes the use of Hybrid Frequency Shift Keying (FSK) and quadrature amplitude modulation (QAM) modulation and sliding window superposition coding (SWSC) as advanced coding modulation (ACM) scheme, filter bank multi carrier (FBMC), non-orthogonal multiple access (NOMA), and sparse code multiple access (SCMA).

The Internet is evolving from a human-centric communication network in which information is generated and consumed by human to the internet of things (IoT) in which distributed things or components exchange and process information. The combination of the cloud server-based big data processing technology and the IoT begets Internet of Everything technology. In order to secure the sensing technology, wired/wireless communication and network infrastructure, service interface technology, and security technology required for implementing the IoT, recent research is focused on the sensor network, machine to machine (M2M), and Machine Type Communication technologies. In the IoT environment, it is possible to provide an intelligent internet technology (IT) which is capable of collecting and analyzing data generated from the connected things to create new values for human life. The IoT can be applied to various fields such as a smart home, a smart building, a smart city, a smart car or a connected car, a smart grid, health care, a smart appliance, and a smart medical service, through legacy information technology (IT) technology and convergence of various industries.

Thus, there are various attempts to apply the IoT to the 5G communication system. For example, the sensor network, M2M, and machine type communication (MTC) technologies are implemented by means of the 5G communication technologies such as beamforming, MIMO, and array antenna. The application of the aforementioned cloud RAN as a big data processing technology is an example of convergence between the 5G and IoT technologies.

As described above, studies are conducted to develop communication techniques in various fields to meet the increasing wireless data traffic demand. The MBMS-based group communication is one of those techniques.

The above information is presented as background information only to assist with an understanding of the present disclosure. No determination has been made, and no assertion is made, as to whether any of the above might be applicable as prior art with regard to the present disclosure.

SUMMARY

In the MBMS-based group communication, a plurality of users may participate in the group communication simultaneously and, this may cause congestion, resulting in degradation of service reliability.

Aspects of the present disclosure are to address at least the above-mentioned problems and/or disadvantages and to provide at least the advantages described below. Accordingly, an aspect of the present disclosure is to provide a method and apparatus for controlling congestion occurring in broadcast resources for a multimedia broadcast and multicast service (MBMS)-based group communication.

In accordance with an aspect of the present disclosure, a broadcast resource congestion control method of a multi-cell/multicast coordination entity (MCE) in a wireless communication system is provided. The broadcast resource congestion control method includes receiving a message including MBMS congestion information from a base station, selecting an MBMS service to be controlled based on the MBMS congestion information, transmitting a scheduling message including first control information related to the selected MBMS service to the base station.

In accordance with another aspect of the present disclosure, a broadcast resource congestion control method of a base station in a wireless communication system is provided. The broadcast resource congestion control method includes transmitting a message including MBMS congestion information to a MCE, receiving a scheduling message including first control information related to an MBMS service to be controlled, the MBMS service being selected based on the MBMS congestion information, and transmitting second control information related to the first control information to a terminal.

In accordance with another aspect of the present disclosure, a broadcast resource congestion control method of a terminal in a wireless communication system is provided. The broadcast resource congestion control method includes receiving second control information related to first control information from a base station and transmitting third control information related to the second control information to a server, wherein the first control information includes information on an MBMS service to be controlled, and the information on the MBMS service to be controlled is determined based on MBMS congestion information transmitted from the base station to an MCE.

In accordance with another aspect of the present disclosure, an MCE for broadcast resource congestion control in a wireless communication system is provided. The MCE includes a communication unit configured to communicate with other network entities and a control unit configured to control receiving a message including MBMS congestion information from a base station, selecting an MBMS service to be controlled based on the MBMS congestion information, and transmitting a scheduling message including first control information related to the selected MBMS service to the base station.

In accordance with another aspect of the present disclosure, a base station for broadcast resource congestion control in a wireless communication system is provided. The base station includes a communication unit configured to communicate with other network entities and a control unit configured to control transmitting a message including MBMS congestion information to an MCE, receiving a scheduling message including first control information related to an MBMS service to be controlled, the MBMS service being selected based on the MBMS congestion information, and transmitting second control information related to the first control information to a terminal.

In accordance with another aspect of the present disclosure, a terminal is provided for broadcast resource congestion control in a wireless communication system. The terminal includes a communication unit configured to communicate with other network entities and a control unit configured to control receiving second control information related to first control information from a base station and transmitting third control information related to the second control information to a server, wherein the first control information includes information on an MBMS service to be controlled, and the information on the MBMS service to be controlled is determined based on MBMS congestion information transmitted from the base station to an MCE.

The present disclosure is advantageous in terms of providing a group communication service efficiently by controlling the congestion occurring in the broadcast resources for MBMS-based group communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
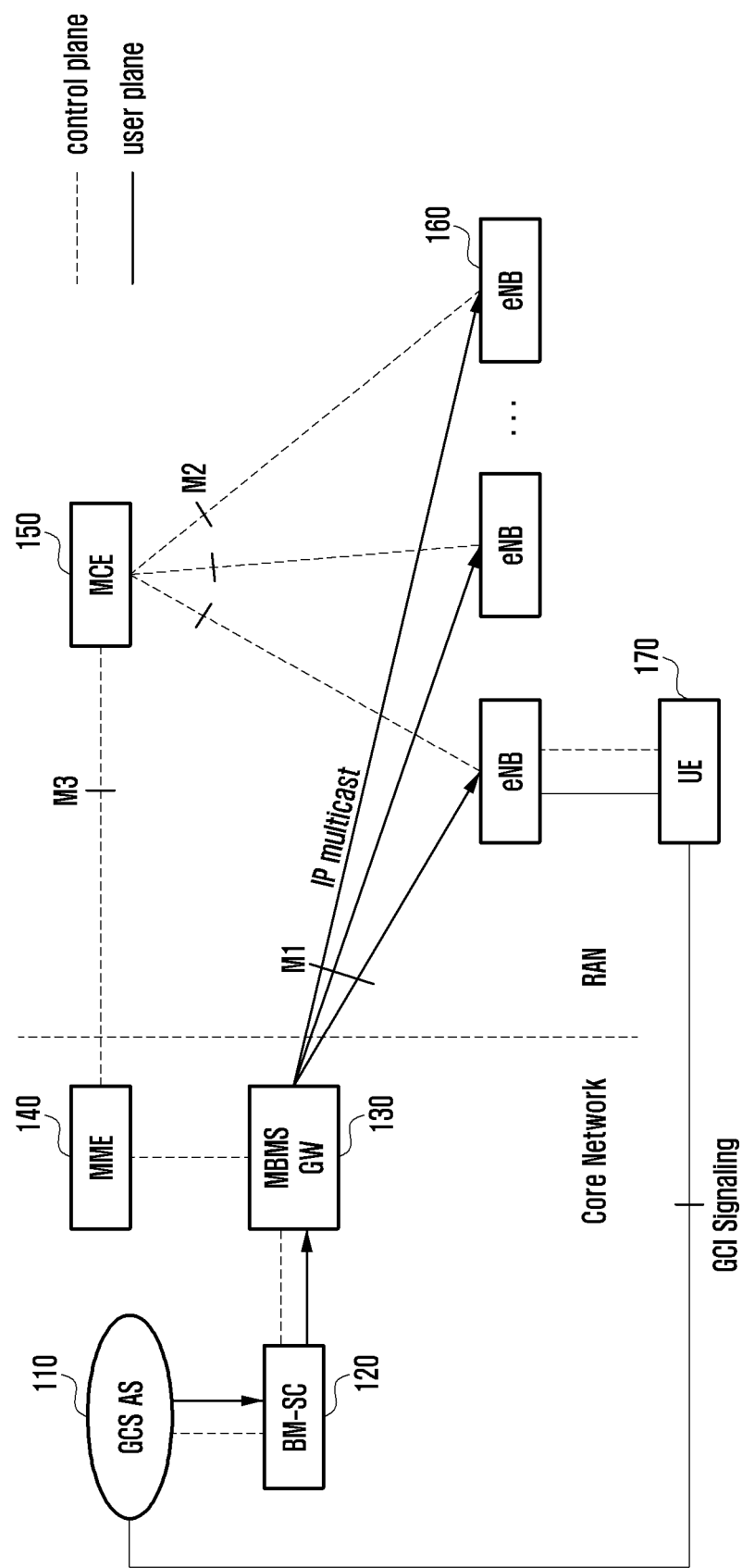
FIG. 1 is a diagram illustrating a system architecture for providing a broadcast service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the Advanced evolved universal terrestrial radio access E-UTRA (or long term evolution advanced (LTE-A)) supporting Carrier Aggregation, it will be understood by those skilled in the art that the present disclosure can be applied even to other communication systems having a similar technical background and channel format, with a slight modification, without departing from the spirit and scope of the present disclosure. For example, the present disclosure can be applied to a multicarrier high speed packet access (HSPA) system supporting Carrier Aggregation.

A description of well-known functions and structures incorporated herein may be omitted to avoid obscuring the subject matter of the present disclosure. This aims to omit unnecessary description so as to make the subject matter of the present disclosure clear.

For the same reason, some elements are exaggerated, omitted or simplified in the drawings and the elements may have sizes and/or shapes different from those shown in drawings, in practice. The same reference numbers are used throughout the drawings to refer to the same or like parts.

Advantages and features of the present disclosure and methods of accomplishing the same may be understood more readily by reference to the following description of various embodiments of the present disclosure and the accompanying drawings. The present disclosure may, however, be embodied in many different forms and should not be construed as being limited to the various embodiments of the present disclosure set forth herein. Rather, these various embodiments of the present disclosure are provided so that this disclosure will be thorough and complete and will fully convey the concept of the disclosure to those skilled in the art, and the present disclosure will be defined by the appended claims.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operations or steps to be performed on the computer or other programmable apparatus to produce a computer implemented process such that the instructions which execute on the computer or other programmable apparatus provide operations or steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to embodiments of the disclosure, means, but is not limited to, a software or hardware component, such as a field programmable gate array (FPGA) or an application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In order to address the problem of excessive resource requirement of the unicast-based group communication, a multimedia broadcast and multicast service (MBMS)-based group communication service may be provided. For example, the MBMS-based group communication service may be provided in a public security network.

In the case that a plurality of users participates in the group communication simultaneously, however, congestion may occur even in the MBMS-based group communication service and thus there is a need of a method for controlling the congestion.

A description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the description is directed to radio access network (RAN) and evolved packet core (EPC) as the core network (CN) of the LTE specified in the 3rd generation partnership project (3GPP) standard, the present disclosure, it is obvious to those skilled in the art that the present disclosure can be applied even to other communication systems having the similar technical background and channel format, with a slight modification, without departing from the spirit and scope of the present disclosure.

FIG. 1 is a diagram illustrating a system architecture for providing a broadcast service according to an embodiment of the present disclosure.

Referring to FIG. 1, the system for providing a broadcast service (hereinafter, referred to as MBMS service) includes a group communication service application server (GCS AS) 110, a broadcast multicast service center (BM-SC) 120, an MBMS Gateway (MBMS GW) 130, a mobility management entity (MME) 140, a multi-cell/multicast coordination entity (MCE) 150, and one or more evolved node B (eNB) 160 (shown as a plurality of sake of description).

The GCS AS 110 may transmit data to a user equipment (UE). According to an embodiment of the present disclosure, the GCS AS 110 may receive information on the MBMS service to be stopped from the UE 170 through GC1 signaling. The term 'GC1 signaling' may be used to indicate all application level data transmitted through the GC1 interface.

The BM-SC 120 may schedule the MBMS transmissions to the UEs. The BM-SC 120 may start the MBMS bearer service in response to a command from the GCS AS 110.

The MBMS GW 130 may distribute the MBMS user plane data to an evolved universal terrestrial radio access network (E-UTRAN) using IP multicasting. The MBMS GW 130 may transmit a session control signal via the MME 140.

The MME 140 is responsible for various control functions as well as the mobility management function and capable of being connected with a plurality of eNBs 160.

The MCE 150 may be implemented in separation from or included in the eNBs 160. The MCE 150 may control allocation and authorization of radio resources for use by all eNBs 160 in a multicast broadcast single frequency network (MBSFN) area. If the radio resources for MBMS service are not sufficient, the MCE 150 may determine not to establish any radio bearer for a new MBMS service and preempt other radio resources from other radio bearers of the ongoing MBMS service according to an allocation retention priority (ARP). According to an embodiment of the present disclosure, the MCE 150 may determine the MBMS services to be stopped, switched to the unicast mode, or preempted among the congested MBMS services and transmit the determination result to the eNB 160.

The eNB 160 corresponds to the legacy node B of the universal mobile telecommunications system (UMTS). The eNB 160 is capable of functions more complex than those of the legacy node B. In the LTE system, all services including the real time services such as voice over IP (VoIP) are provided through a shared channel, the eNB 160 collects state information such as UE buffer status, power headroom status, and channel status and schedules the UEs based thereon. Typically, the eNB 160 controls a plurality of cells.

Figure 2A:
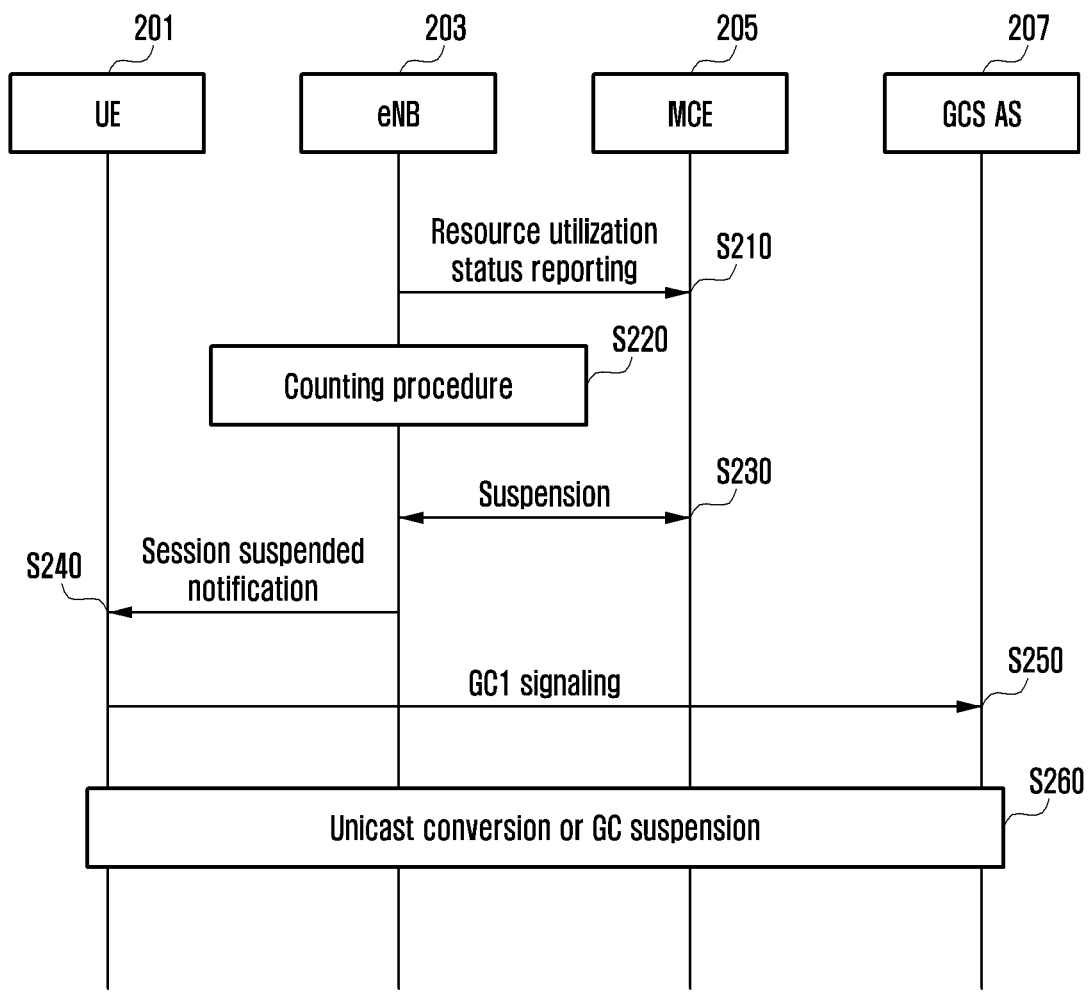
FIG. 2A is a signal flow diagram illustrating a congestion control method according to an embodiment of the present disclosure.

FIG. 2A is a signal flow diagram illustrating a congestion control method according to an embodiment of the present disclosure.

Referring to FIG. 2A, the MBMS group communication may cause congestion of a radio access network (RAN).

If congestion occurs in the RAN, at least one of the GCS AS and MCE has to receive the information about the MBMS congestion so as to resolve the MBMS congestion. If the congestion status information is received, the GCS AS and/or MCE may perform at least one of the following control operations for the MBMS bearer and/or service.

Pre-emption;
Suspension;
Switch to Unicast mode.

In the following, a description is made of a method for the GCS AS and/or MCE to receive the MBMS-related congestion status information (hereinafter, referred to as MBMS-related congestion information) of an eNB and control the congestion status.

Various embodiments of the present disclosure are described with reference to the accompanying drawings in more detail. The same reference numbers are used throughout the drawings to refer to the same or like parts. A description of well-known functions and structures incorporated herein may be omitted to avoid obscuring the subject matter of the present disclosure.

Referring to FIG. 2A, the eNB 203 reports the MBMS resource utilization status to the MCE 205 at operation S210. This report may be made in response to a request from the MCE 205.

Such a status report may be made periodically. In the case of reporting the MBMS resource utilization status periodically, the report period may be determined based on a request from the MCE 205 to the eNB 203. The MCE 205 may send the eNB 203 a resource utilization status request message including the period information.

The MBMS resource utilization status report may be transmitted to the MCE 205 a periodically, e.g., when the resource utilization level is greater or less than a predetermined threshold value.

The resource utilization status report may be performed per MBSFN area and/or multicast channel (MCH) and/or physical multicast channel (PMCH), or per MBSFN are and/or MBSFB subframe and/or PMCH. At this time, the resource utilization status may be transmitted in the form of percentage or degrees.

It is also obvious that the resource utilization status can be reported using one-bit information. For example, the eNB 203 may transmit a 1-bit indicator indicating one of normal and overload states.

Figure 3:
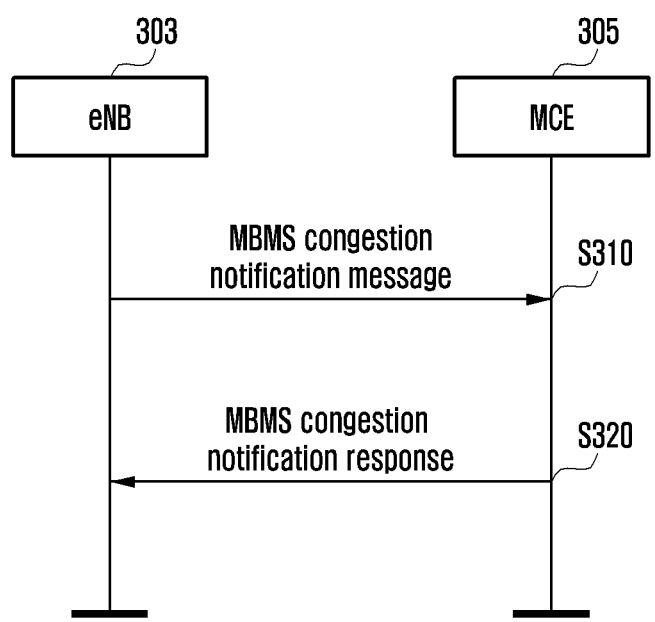
FIG. 3 is a signal flow diagram illustrating a procedure for an evolved note B (eNB) to report resource utilization status to an multi-cell/multicast coordination entity (MCE) according to an embodiment of the present disclosure.

The resource utilization status report procedure is depicted in FIG. 3.

FIG. 3 is a signal flow diagram illustrating a procedure for an eNB to report resource utilization status to an MCE according to an embodiment of the present disclosure.

The resource utilization status report may be implemented with one of Class 1 and Class 2 procedures.

The class 1 procedure includes an operation of transmitting a resource utilization status report from the eNB 303 to the MCE 305 and an operation of transmitting a response message from the MCE 305 to the eNB 303 in reply to the report. At this time, the response message may include the information indicating that the operation associated with the message transmitted by the eNB 303 is performed successfully.

Meanwhile, the class 2 procedure includes an operation of transmitting a resource utilization status report from the eNB 303 to the MCE 305 and transmitting a response from the MCE 305 to the eNB 303 but does not include any operation of transmitting a response message. In the class 2 procedure, since no response message is received from the MCE 305, the eNB 303 may assume that the MCE 305 has received the resource utilization status report successfully when no response message is received.

Referring to FIG. 3, the operation of reporting the resource utilization status is implemented with the class 1 procedure. If the class 2 procedure is applied, it is obvious that the procedure can be implemented with only the operation at which the eNB transmits the resource utilization status report to the MCE.

In FIG. 3, the eNB 303 transmits an MBMS CONGESTION NOTIFICATION message to report the resource utilization status the MCE 305 at operation 5310. At this time, the message transmitted from the eNB 303 to the MCE 305 may have a name different from that used in FIG. 3. For example, a message called MBMS OVERLOAD NOTIFICATION may replace the MBMS CONGESTION NOTIFICATION message for use in reporting resource utilization status to the MCE 305.

The message which the eNB 303 uses to report the resource utilization status to the MCE 305 may include the content indicating the resource utilization status per MBSFN area or PMCH. Table 1 shows a structure of the above message.

TABLE 1

| IE/Group Name | Presence | Range | IE type and reference |
|---|---|---|---|
| Message Type | M | | |
| MBSFN Area ID | M | | INTEGER (0 ... 255) |
| Overload Status Per PMCH List | | 1 | |
| >Overload Status Per PMCH Item IEs | | 1..<maxnoofPMCHsperMBSFNarea> (= 15) | |
| >>PMCH Overload Status | M | | ENUMERATED (Normal, Overload, ...) |
| >>Active MBMS Session List | | 0..1 | |
| >>>Active MBMS Session Item IEs | | 1.. <maxnoofSessionsPerPMCH> (= 29) | |
| >>>>MBMS Service Identity | M | | TMGI |

Referring to Table 1, the message for use in reporting resource utilization status may include:
  MBSFN area identity (MBSFN Area ID) Information Element to identify the MBMS area of which the resource utilization status is reported; and
  PMCH Overload Status Information Element to indicate the resource utilization status per PMCH supported in the MBSFN area identified by the MBSFN area identity Information Element.

However, the aforementioned Information Elements are just examples, but the information included in the message for a resource utilization status report is not limited thereto. If it is reported that a PMCH is in overload state, the MCE recognizes that the user data of the MBMS service carried on the corresponding PMCH are not delivered smoothly via the eNB in the scheduled period based on the report. If it is reported that a PMCH is in a normal state, the MCE recognizes that there is no overload any more on the corresponding PMCH.

The message used for resource utilization status report may include the information indicating the MBMS services activated per PMCH. Since no user data is delivered via the MCE, the MCE may not know the transfer of user data of the respective MBMS services (although the MCE has played the role of assigning resources for the MBMS services per PMCH in the MBMS session initialization procedure). Thus, the information on activation/deactivation per MBMS service may be necessary.

If the MBMS congestion notification message is received, the MCE 305 sends the eNB 303 an MBMS congestion notification response message in replay at operation 5320.

If an overload report is received, the MCE may select one of the activated MBMS services to suspend the selected MBMS service. The suspension determination procedure of the MCE is described with reference to FIG. 2A. Returning to FIG. 2A, the MCE 205 which has received the resource utilization status report transmitted by the eNB 203 may include the information on the MBMS bearer(s) to be suspended immediately in the message to be transmitted to the eNB 203. This information may be configured in the form of a Temporary Mobile Group Identity (TMGI) list. A description thereon is made in association with the operation at operation 220.

The MCE 205 counts the UEs interested in the MBMS service per TMGI at operation 5220. That is, the eNB 203 initiates a counting procedure. The MCE 205 may suspend the service having a small number of UEs which are receiving or interested in the corresponding service. Whether to suspend a certain MBMS service may be determined based on the activated MBMS service list and/or allocation and retention priority (ARP) of the MBMS service as well as the counting result. It is obvious that considering the counting result is not mandatory.

The MCE 205 determines whether to suspend at least one MBMS service and sends the eNB 203 an MBMS SCHEDULING INFORMATION message (M2) at operation 5230. This message carries the MCCH information.

The MBMS SCHEDULING INFORMATION message may include the information indicating the MBMS bearers to be suspended as well as the MCCH information.

This message also may include a time stamp. The time stamp is transmitted for use at the eNB 203 in determining the time to transmit the suspension information to a UE 201. That is, the time stamp may indicate the time when the information indicating the suspension of the corresponding MBMS service is transmitted from the eNB 203 to the UE 201. The time stamp may be expressed by system frame number. The suspension information transmitted by the eNB 203 may be delivered until the end of the modification period right before the time indicated by an MCCH Update Time IE.

Table 2 shows a configuration of the MBMS SCHEDULING INFORMATION message.

TABLE 2

| IE/Group Name | Presence | Range | IE type and reference |
|---|---|---|---|
| Message Type | M | | |
| MCCH Update Time | M | | INTEGER (0 ... 255) |
| MBSFN Area Configuration List | | 1 | |
| >MBSFN Area Configuration Item IEs | | 1 to <maxnoofMBSFNareas> (= 256) | |
| >>MBMS Suspension Notification List | | 0..1 | |

TABLE 2-continued

| IE/Group Name | Presence | Range | IE type and reference |
|---|---|---|---|
| >>>MBMS Suspension Notification Item IEs | | 1 to <maxnoofPMCHsperMBSFNarea> (= 15) | |
| >>>>SFN | M | | INTEGER (0 . . . 1023) |
| >>>>MBMS Sessions To Be Suspended List per PMCH | | 1 | |
| >>>>>MBMS Sessions To Be Suspended List per PMCH Item | | 1 to <maxnoofSessionsPerPMCH> (= 29) | |
| >>>>>>MBMS Service Identity | M | | TMGI |

Referring to FIG. 2, the MBMS SCHEDULING INFORMATION message may be used to transmit the time stamp (SFN IE in table 2) and the identifier of the MBMS service to be suspended (TMGI) per MBSFN area per PMCH.

The eNB 203 sends the UE 201 the suspension information at operation S240. That is, the eNB 203 may notify the UE 201 of the MBMS services suspended and/or to be suspended.

The eNB 203 may use the MCH Scheduling Information (MSI) field to transmit the suspension information. The MAC Control Element called MSI consists of n scheduling information elements of {5-bit logical channel identifier (LCID) field, 11-bit Stop multicast traffic channel (MTCH) field} occupying 2n octets as shown in FIG. 4.

Figure 4:
FIG. 4 is a diagram illustrating a MAC control element (CE) for use in transmitting suspension information from an eNB to a user equipment (UE) according to an embodiment of the present disclosure.

FIG. 4 is a diagram illustrating an extended MAC control element (CE) for use in transmitting suspension information from an eNB to a UE according to an embodiment of the present disclosure.

Referring to FIG. 4, the eNB uses the MAC CE called MCH scheduling information (MSI) which is extended from 2n octets to 2n+1+y octets to indicate the MBMS services to be suspended. The eNB may also transmit a predetermined value (hereinafter, value X is interchangeably used) for MTCH (identified by LCID) carrying the MBMS service to be suspended together.

The predetermined value (i.e., value X) indicates that the MBMS session initiated on the corresponding MTCH has been suspended or may be suspended. The value X may follow the LCID like the legacy Stop MTCH field. For example, the value X may be set to "000". The eNB is capable of further extending the MAC CE to notify the UE of the time when the corresponding MBMS session is suspended.

Returning to FIG. 2A, if the session suspended notification is received, the UE notifies the GCS AS of imminent suspension of the MBMS service through GC1 application signals at operation S250. Here, the information transmitted through the GC1 interface may include at least one of a GCS identifier (ID), TMBI, and UE location (e.g., MBMS SAI and/or ECGI). The UE may need to determine the TMGI corresponding to the LCID of the MSI CE. The GCS AS determines the services as targets for unicast conversion, suspension, and preemption based on the GCS ID and/or TMGI. If the information on the time when the corresponding MBMS session or MBMS service is suspended is received from the eNB, the UE transmits this information (with or without being processed) through the GC1 signaling.

Meanwhile, the GCS AS and/or configuration management server may preconfigure some UEs to react (to initiate GC1 signaling) in response to the information received through the extended MSI MAC CE in the user authentication procedure or group communication setup procedure. In this way, it is possible to reduce the GC1 signaling.

Afterward, the GCS AS 207 determines to deliver the group call (identified by TMGI and/or GCS ID) through unicast which is currently being delivered through the MBMS bearer at operation 5260. The GCS AS 207 performs delivery mechanism conversion on the corresponding service to a unicast bearer.

Figure 2B:
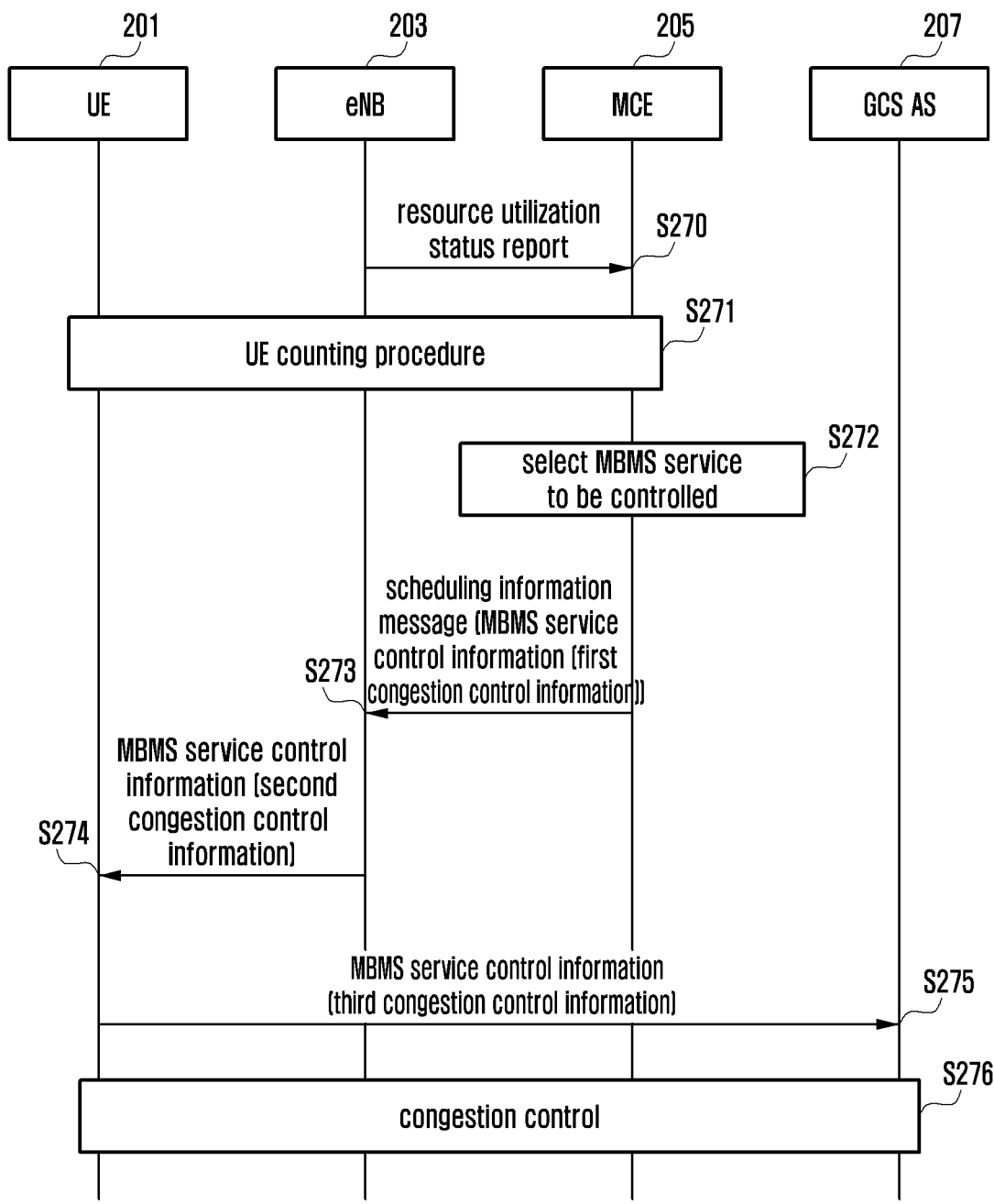
FIG. 2B is a flowchart illustrating a congestion control method according to an embodiment of the present disclosure.

FIG. 2B is a flowchart illustrating a congestion control method according to an embodiment of the present disclosure.

Referring to FIG. 2B, the eNB 203 sends the MCE 205 a MBMS resource utilization status report at operation 5270. The eNB 203 may use the MBMS CONGESTION NOTIFICATION message to report the resource utilization status to the MCE 205.

The MBMS CONGESTION NOTIFICATION message may include the PMCH Overload Status information indicating the resource utilization status per PMCH supported in the are identified by the MBSFN Area ID and the identity information as described above. The MBMS CONGESTION NOTIFICATION message also may include the information indicating the activated MBMS services per PMCH. In the present disclosure, the information included in the MBMS CONGESTION NOTIFICATION message is referred to as MBMS congestion information. Since the information included in the MBMS CONGESTION NOTIFICATION message and the procedure of transmitting the message are identical with those described with reference to operation S210 of FIG. 2A, descriptions thereof are omitted herein.

If the resource utilization status report is received, the MCE 205 determines the number of UEs which are receiving or interested in the MBMS service identified by each TMGI at operation 5271. The process of determining the UEs which are receiving or interested in the MBMS service is referred to as a UE counting process. At this time, the TMGI may be used as a MBMS service identifier.

After determining the number of UEs interested in the MBMS service, the MCE 205 determines the MBMS service to control at operation 5272. At this time, controlling an MBMS service means at least one of suspending the MBMS service, switching the MBMS service from the broadcast delivery to the unicast delivery, and preempting the MBMS service.

The MCE 205 may determine to control the MBMS service having the smallest number of UEs interested therein. The MCE 205 also may determine the MBMS service to control based on the activated MBMS service list and/or ARP of MBMS service as well as the number of UEs interested in the MBMS service.

After determining the MBMS service to control, the MCE 205 sends the eNB 205 a scheduling information message including the information on the MBMS service to be controlled (first congestion control information) at operation S273.

Hereinafter, the information on the MBMS service to control is referred to as MBMS service control information. In order to distinguish among the MBMS service control information transmitted by the MCE, the eNB, and the UE, the information transmitted from the MCE to the eNB is referred to as the first congestion control information, the information from the eNB to the UE as the second congestion control information, and the information from the UE to the GCS AS the third congestion control information.

The first congestion control information transmitted from the MCE to the eNB may include MCCH information. The MBMS service information may include an identifier (TMGI) of the MBMS service to control.

The first congestion control information transmitted by the MCE may include transmission time information (e.g., time stamp). The transmission time information means the information indicating the time when the eNB 203 transmits the MBMS service control information (i.e., second congestion control information) to the UE 201.

If the scheduling information message is received, the eNB 203 sends the UE 201 the second congestion control information at operation S274. The eNB 203 generates the second congestion control information based on the first congestion control information included in the scheduling information message and transmits the second congestion control information to the UE 201.

In more detail, the eNB 203 determines the MBMS service to be controlled and the channel for delivering the MBMS service based on the TMGI contained the MCCH information included in the first congestion control information and then includes the logical channel identifier of the MTCH carrying the MBMS service to be controlled in the second congestion control information.

The eNB 203 may use the MSI field to transmit the second congestion control information to the UE 201. In more detail, the eNB may transmit a predetermined value set for the MTCH carrying the MBMS service to be control in the MAC CE of MSI. At this time, the MTCH may be identified based on the LCID included in the MAC CE. The predetermined value may indicate that the MBMS service carried on the corresponding MTCH has been suspended or is to be suspended. Accordingly, the UE 201 can determine that the MBMS service provided through the MTCH corresponding to the predetermined value has been suspended or is to be suspended based on the MAC CE of the received MAI.

If the second congestion control information is received, the UE 201 sends the GCS AS 207 the MBMS service control information (i.e., third congestion control information) at operation S275. The UE 201 determines the MBMS service to control based on the second congestion control information and generates the third congestion control information to be transmitted to the GCS AS 207 based thereon.

The third congestion control information may include at least one of the GCS identifier, MBMS service identifier, and UE location (MBMS SAI and/or ECGI). The UE 201 may transmit the third congestion control information to the GCS AS 207 through GC1 application signaling.

If the third congestion control information is received, the GCS AS 207 determines the MBMS services to which unicast conversion, suspension, and preemption are applied based on the GCS ID and/or TMGI.

Afterward, the GCS AS 207 performs congestion control on the selected MBMS service at operation S276. That is, the GCS AS 207 may perform one of unicast conversion, suspension, and preemption on the selected MBMS service.

Since there is no interface for direct signaling between the MCE 205 and GCS AS 207, it is impossible for the MCE 205 to transmit the MBMS service control information to the GCS AS 207 directly. However, when congestion occurs in the radio broadcast resource, it is necessary for the MCE 205 to determine the MBMS service to control and notify the GCS AS 207 of the corresponding MBMS service.

Accordingly, the MCE 205 sends the GCS AS 207 the MBMS service control information via the eNB 203 and UE 201 such that the GCS AS 207 controls the congestion on the broadcast resource and provides the group communication services efficiently through MBMS.

Figure 5:
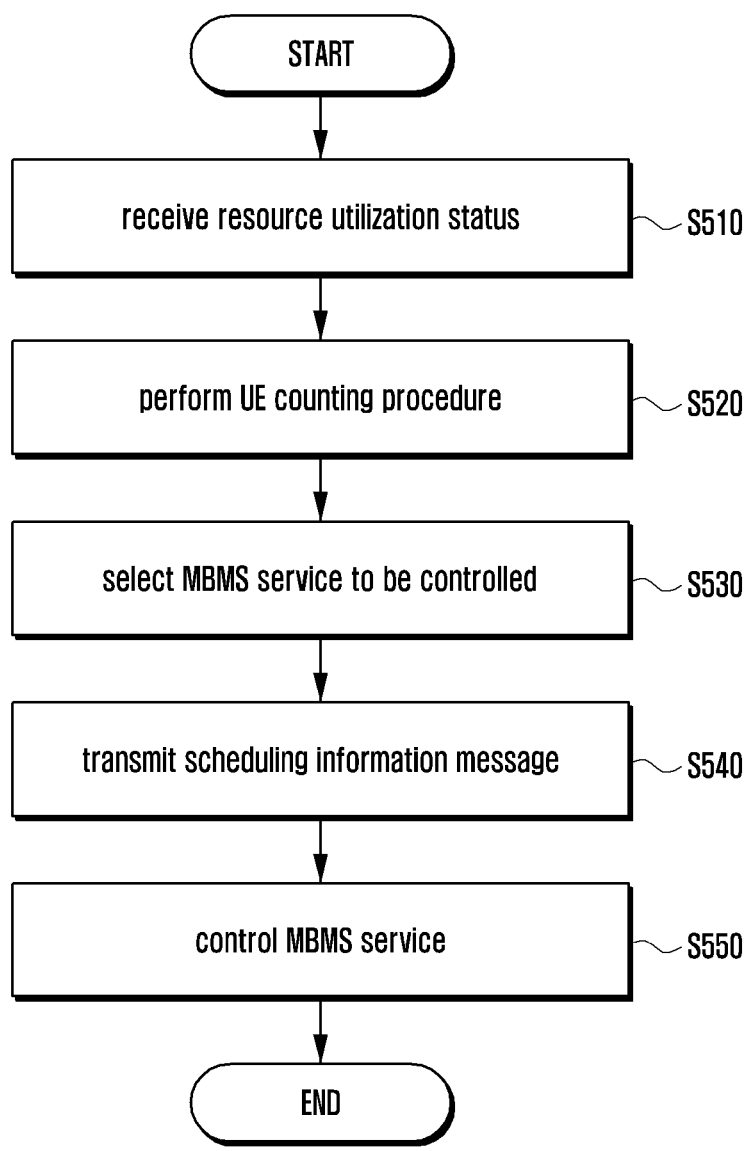
FIG. 5 is a flowchart illustrating a broadcast resource congestion control method of an MCE according to an embodiment of the present disclosure.

FIG. 5 is a flowchart illustrating a broadcast resource congestion control method of an MCE according to an embodiment of the present disclosure.

Referring to FIG. 5, an MCE receives a resource utilization status report from an eNB at operation S510. The eNB may send the MCE an MBMS CONGESTION NOTIFICATION message carrying the resource utilization status report in order for the MCE to determine the resource utilization status based on the MBMS congestion information included in the MBMS CONGESTION NOTIFICATION message. A more detailed description thereof is omitted herein because it has been made above.

If the resource utilization status report is received, the MCE determines the number of UEs which are receiving or interested in the MBMS service per TMGI included in the MBMS CONGESTION NOTIFICATION message at operation S520 (i.e., UE counting procedure).

After determining the number of UEs which are receiving or interested in the MBMS service corresponding to each TMGI, the MCE selects an MBMS service to be controlled based on the number of UEs which are receiving or interested in the MBMS service at operation S530. For example, the MCE may select the MBMS service having the least number of UEs which are receiving the MBMS service or interested therein. The MCE also may select the MBMS service to be controlled based on the number of UEs which are receiving or interested in the MBMS service and MBMS congestion control information.

Here, the MBMS service to be controlled may be one of the MBMS service to be suspended, the MBMS service to be switched to the unicast delivery, and the MBMS service to be preempted.

After determining the MBMS service to be controlled, the MCE sends the eNB a scheduling information message including the information on the MBMS service to be controlled (the first congestion control information herein as the MBMS service control information) at operation S540. The first congestion control information may include MCCH information and identifier of the MBMS service to be controlled. The first congestion control information also may include transmission time information as described above.

After transmitting the scheduling information, the MCE controls the corresponding MBMS service at operation S550. For example, the MCE may suspend the MBMS service, switch the MBMS service to the unicast delivery, or preempt the MBMS service. The MCE also may control the MBMS service as the GCS AS does.

However, if the GCS AS is configured to control the MBMS service, operation S550 may be omitted.

If the MBMS service control information (i.e., first congestion control information) is received, the eNB sends the UE the MBMS service control information (i.e., second congestion control information). At this time, the second congestion control information may be generated based on the first congestion control information.

If the MBMS service control information (i.e., second congestion control information) is received, the UE may send the GCS AS the MBMS service control information (i.e., third congestion control information).

In this way, the MCE transmits the MBMS service control information to the GCS AS via the eNB and the UE such that the information on the MBMS service to be controlled can be delivered to the GCS AS having no direct interface.

Figure 6:
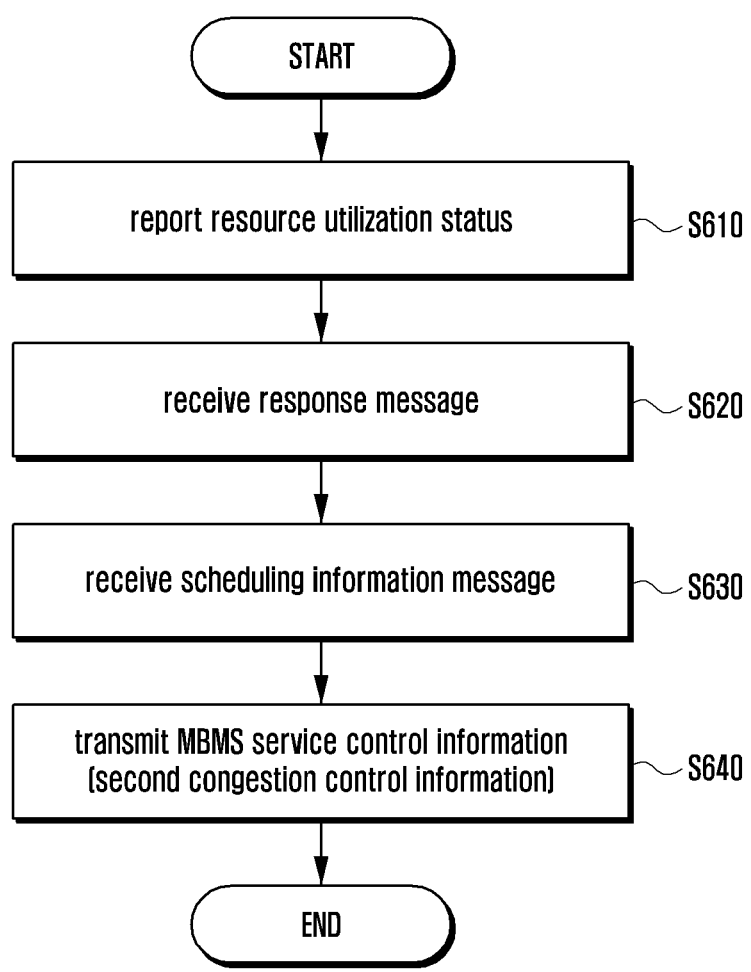
FIG. 6 is a flowchart illustrating a broadcast resource congestion control method of an eNB according to an embodiment of the present disclosure.

FIG. 6 is a flowchart illustrating a broadcast resource congestion control method of an eNB according to an embodiment of the present disclosure.

Referring to FIG. 6, the eNB sends the MCE a resource utilization status report at operation S610. As described above, the eNB may use the MBMS CONGESTION NOTIFICATION message to report the resource utilization status to the MCE.

The eNB may report the resource utilization status in response to a request from the MCE. The eNB may report the resource utilization status periodically. The eNB may determine the report period based on the value transmitted by the MCE.

The eNB may report the resource utilization status to the MCE when the resource utilization level is greater than a maximum value or less than a minimum value of a predetermined threshold range.

The message carrying the resource utilization status report may include the MBMS congestion information including the MBSFN area identity information and MBSFN area overload status information. The MCE may determine the resource utilization status per MBSFN area, per MCH, and per PMCH based on the MBMS congestion information.

After reporting the resource utilization status, the eNB receives a response message in response to the resource utilization status report at operation S620. However, operation S620 may be omitted.

In more detail, the resource utilization status report method may be implemented with the class 1 procedure with the operation of receiving a response message or the class 2 procedure without the operation of receiving the response message.

Afterward, the eNB receives the scheduling information message including the information on the MBMS service as a control target selected by the MCE (MBMS service control information, particularly the first congestion control information) at operation S630. The first congestion control information may include the service identifier of the MBMS service to be controlled. A more detailed description thereof is omitted herein because it has been made above.

After receiving the MBMS service control information through the scheduling information message, the eNB sends the UE the MBMS service control information (i.e., second congestion control information) at operation S640.

At this time, the eNB may transmit the second congestion control information using the MSI field. In more detail, the eNB may transmit a predetermined value set for the MTCH carrying the MBMS service to be control in the MAC CE of MSI.

Accordingly, the UE 201 can determine that the MBMS service provided through the MTCH corresponding to the predetermined value is the service controlled or to be controlled.

Afterward, the UE determines the MBMS service to be controlled based on the second congestion control information and sends the GCS AS the third congestion control information related to the MBMS service to be controlled through GC1 signaling. A description of the UE operation is made with reference to FIG. 7.

Figure 7:
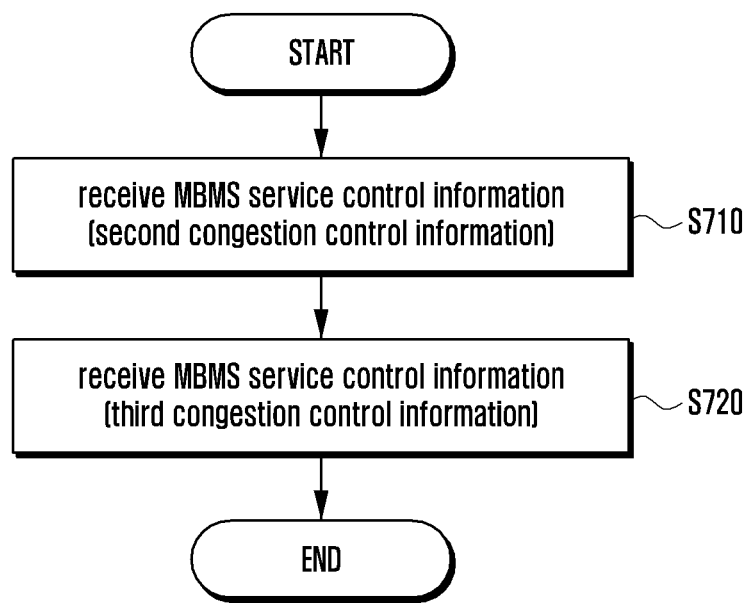
FIG. 7 is a flowchart illustrating a broadcast resource congestion control method of a UE according to an embodiment of the present disclosure.

FIG. 7 is a flowchart illustrating a broadcast resource congestion control method of a UE according to an embodiment of the present disclosure.

Referring to FIG. 7, the UE receives the MBMS service control information (i.e., second congestion control information) related to the MBMS service to be controlled from the eNB at operation S710.

The second congestion control information may include a logical channel identifier of the MTCH carrying the MBMS service.

In more detail, the MBMS service as a control target determined by the MCE is informed to the UE using the information included in the MAC CE of MSI. At this time, the eNB transmits a predetermined value for the MTCH carrying the MBMS service in the MAC CE of MSI to indicate the MBMS service to be controlled. Accordingly, the UE may determine the MBMS service to be controlled based on the logical channel identifier of the MTCH.

After receiving the second congestion control information, the UE sends the GCS AS the MBMS service control information (i.e., third congestion control information) through GCS signaling at operation S720. At this time, the third congestion control information may include the GCS ID, the TMGI, and the UE location.

If this information is received, the GCS AS may perform one of switching the MBMS service as a control target to the unicast delivery, suspending the MBMS service, and preempting the MBMS service.

Figure 8:
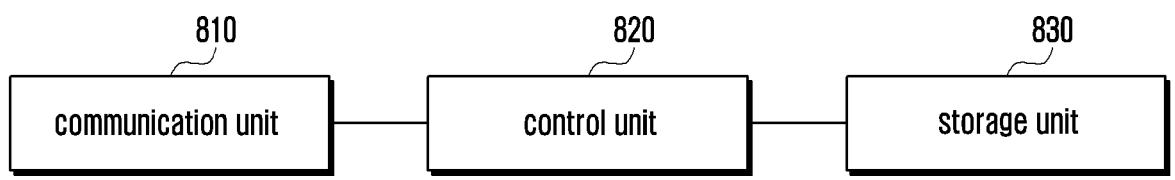
FIG. 8 is a block diagram illustrating a configuration of an MCE according to an embodiment of the present disclosure.

FIG. 8 is a block diagram illustrating a configuration of an MCE according to an embodiment of the present disclosure.

Referring to FIG. 8, the MCE according to an embodiment of the present disclosure includes a communication unit 810, a control unit 820, and a storage unit 830.

The communication unit 810 is responsible for communication with other network entities. The communication unit 810 may communicate with an MME through an M3 interface on the control plane. The communication unit 810 also may communicate with an eNB through an M2 interface on the control plane.

The control unit 820 may receive a resource utilization status report from the eNB and transmit a response message in reply. The control unit 820 also may determine a number of UEs which are receiving or interested in the MBMS service. The control unit 820 is capable of determining the MBMS service to be controlled based on the resource utilization status and the number of UEs.

The control unit 820 also may send the eNB a scheduling information message including MBMS service control information (or the first congestion control information) as the information on the MBMS service to be controlled.

The MBMS service control information may be transmitted from the eNB to a UE and then from the UE to a GCS AS.

The storage unit 830 may store the information on a period for receiving the resource utilization status report from the eNB. The storage unit 830 also may store the received resource utilization status information and the information on the MBMS service selected as a control target.

Figure 9:
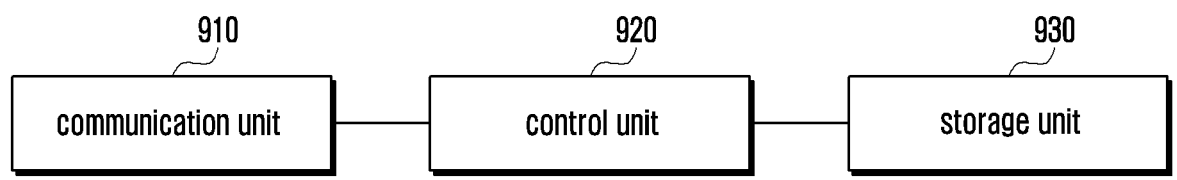
FIG. 9 is a block diagram illustrating a configuration of an eNB according to an embodiment of the present disclosure.

FIG. 9 is a block diagram illustrating a configuration of an eNB according to an embodiment of the present disclosure.

Referring to FIG. 9, the eNB according to an embodiment of the present disclosure includes a communication unit 910, a control unit 920, and a storage unit 930.

The communication unit 910 is responsible for communication with other network entities. The communication unit 910 is capable of communicating with a UE through a radio link. The communication unit 910 also may communicate with an MCE through an M2 interface.

The control unit 920 may report resource utilization status to the MCE. At this time, the control unit 920 may report the resource utilization status at a period indicated in a message received from the MCE. The control unit 920 also may receive MBMS service control information (i.e., first congestion control information) from the MCE. At this time, the information may include an MBMS service identifier and transmission time information indicating the time when the MBMS service control information is transmitted to the UE.

The control unit 920 may send the MBMS service control information (i.e., second congestion control information) including an identifier of the channel carrying the MBMS service to the UE. At this time, the control unit 920 may transmit the MBMS service control information using a MAC Control Element (CE) of the MSI field. The control unit 920 also may transmit the MBMS service control information (i.e., second congestion control information) to the UE based on the transmission time information received from the MCE.

The storage unit 930 may store resource utilization status report period received from the MCE. The storage unit 930 also may store the MBMS service control information received from the MCE.

Figure 10:
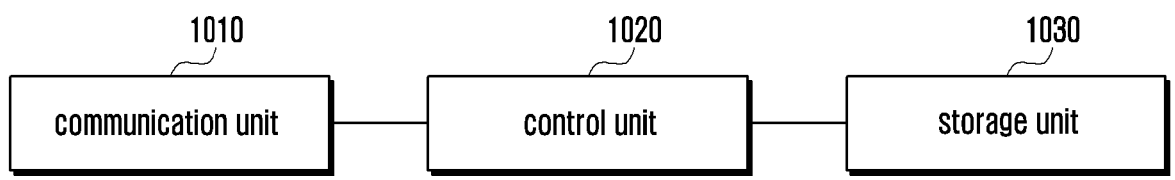
FIG. 10 is a block diagram illustrating a configuration of a UE according to an embodiment of the present disclosure.

FIG. 10 is a block diagram illustrating a configuration of a UE according to an embodiment of the present disclosure.

Referring to FIG. 10, the UE according to an embodiment of the present disclosure includes a communication unit 1010, a control unit 1020, and a storage unit 1030.

The communication unit 1010 is responsible for communication with other network entities. The communication unit 1010 may communicate with an eNB through a radio link.

The control unit 1020 may receive MBMS service control information (i.e., second congestion control information) from the eNB. The control unit 1020 also may transmit the MBMS service control information (i.e., third congestion control information) to a GCS AS through GCI signaling. At this time, the control unit 920 may send the MBMS service control information including a GCS identifier, MBMS service identifier, and UE location to the GCS AS.

The storage unit 1030 may store UE location information. The storage unit 1030 may also store the GCS identifier. The storage unit 1030 may provide the control unit 1020 with the stored information when it transmits the MBMS service control information to the GCS AS.

A description is made of a method and apparatus of controlling In-Device Coexistence (IDC) interference according to an embodiment of the present disclosure.

The following embodiment of the present disclosure relates to a method and apparatus for controlling in-Device coexistence (IDC) interference in a mobile communication system operating in Dual Connectivity mode. Recently, a UE is provided with multiple communication modules for short range communication technologies as well as cellular communication technology such as LTE. The UE also may receive various electric wave signals from the outside for specific purposes such as GPS. In order to achieve this, the UE is equipped with various communication modules, which may interfere with each other. In the LTE standard, IDC technology is adopted to control such interference.

Dual Connectivity is being discussed to increase the per-user throughput by allowing a UE to connect with multiple eNBs in LTE. In this technology, the UE uses a plurality of serving frequencies, resulting in an increase of the probability of IDC interference. However, the current IDC technology has a drawback in that it is designed without consideration of multiple serving frequencies. The present disclosure proposes a method for controlling the IDC interference efficiently.

Figure 11:
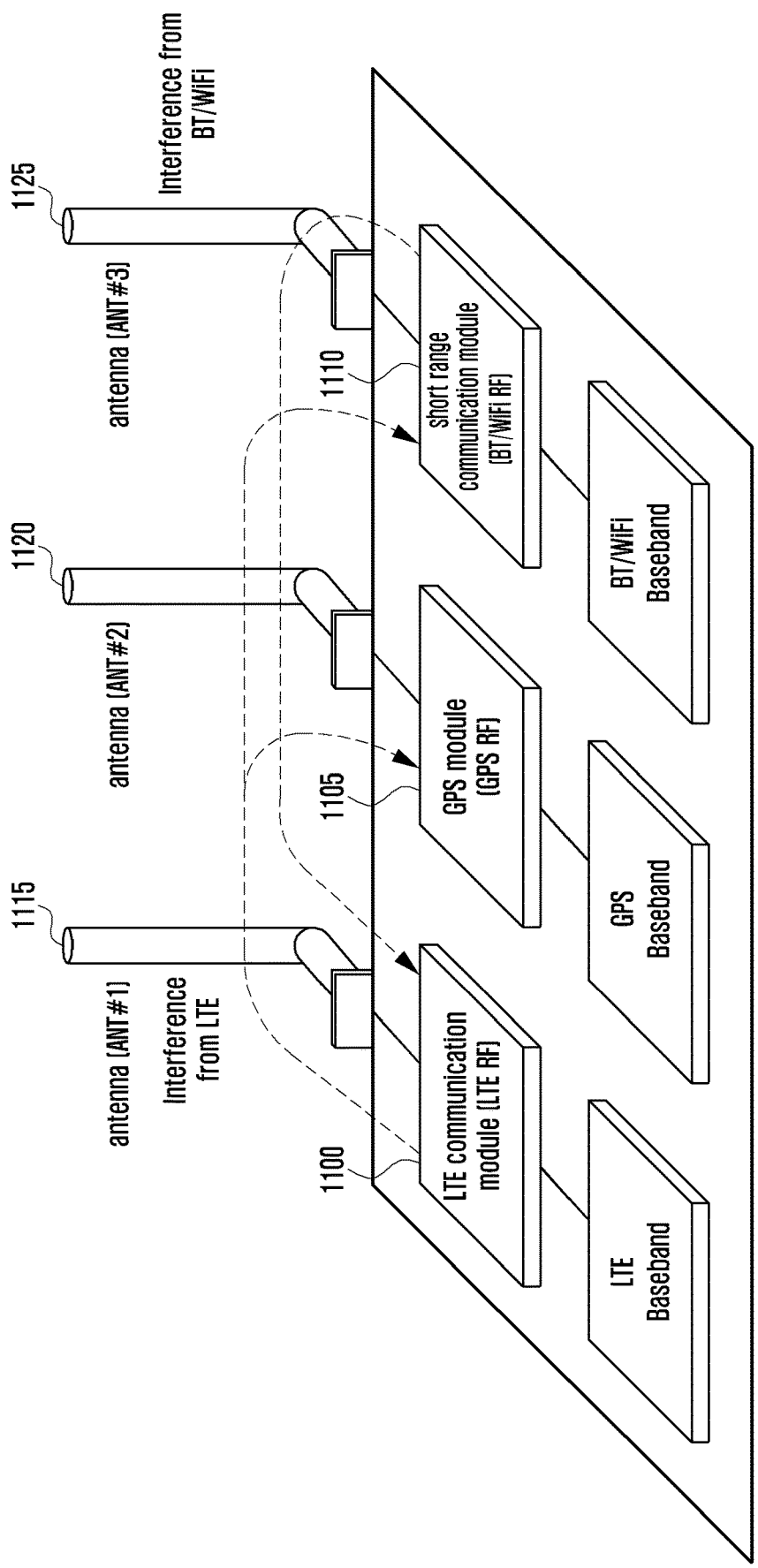
FIG. 11 is a diagram illustrating a configuration of a communication unit of a UE for explaining in-device coexistence (IDC) technology according to an embodiment of the present disclosure.

FIG. 11 is a diagram illustrating a configuration of a communication unit of a UE for explaining the IDC technology.

Referring to FIG. 11, IDC is a technology for minimizing the interference between communication modules embodied in a device. Recent UEs are provided with various functions for which several communication modules may be included. In addition to an LTE communication module 1100, a GPS module 1105 and a short range communication module 1110 such as Bluetooth and WLAN module are included. Such modules are responsible for data communication through respective antennas 1115, 1120, and 1125.

Although the communication systems operate on different frequency bands, the adjacent bands may cause interference between communication modules operating thereon. This is because it is difficult to separate the signals transmitted/received on the different bands from each other ideally. Furthermore, because the antennas connected to the respective communication modules must be arranged inside the UE, in which space is limited, the antennas are placed in very close proximity. Accordingly, the relative interference strength between signals transmitted/received through the tightly arranged antennas is likely to be strong. In order to mitigate the IDC interference, it is necessary for the UE to control the transmit powers of the respective communication modules.

For example, when the short range communication module 1110 such a Bluetooth module and WLAN module attempts data reception on an LTE uplink, the Tx signal of the LTE communication module 1100 may cause interference to the short range communication module 1110. In order to mitigate this interference, it can be considered to restrict the uplink maximum transmit power of the LTE communication module 1100. Also, it can be considered to nullify the interference power amount influencing the short range communication module 1110 by suspending the operation of the LTE communication module 1100. In contrast, the short range communication module 1110 may interfere with the reception signal of the LTE communication module 1100 on the LTE downlink.

Although the IDC technology has been developed to avoid interferences among the communication modules coexisting in a device, it can be used to mitigate interference among various communication technologies of neighboring devices as proposed in the present disclosure.

Figure 12:
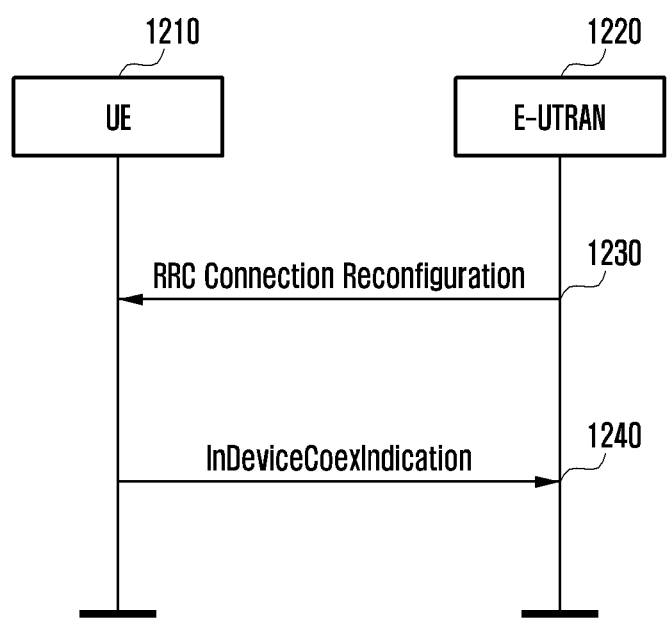
FIG. 12 is a signal flow diagram illustrating a procedure for a UE to provide an eNB with information for use in minimizing IDC interference according to an embodiment of the present disclosure.

FIG. 12 is a signal flow diagram illustrating a procedure for a UE to provide an eNB with information for use in minimizing IDC interference according to an embodiment of the present disclosure.

Referring to FIG. 12, the eNB 1220 may configure the UE 1210 to report the presence/absence of the IDC interference and UE-recommended IDC avoidance scheme using an RRCConnectionReconfiguration message. The OtherConfig IE of the RRCConnectionReconfiguration message may include the IDC-Config IE as shown in Table 1, and the eNB 1220 may configure the IDC report to the UE 1210 using this IE.

Discontinuous Reception (DRX) configuration information for minimizing IDC interference is illustrated in Table 3.

TABLE 3

```
IDC-Config-r11 ::=              SEQUENCE {
    idc-Indication-r11              ENUMERATED {setup}      OPTIONAL,  -- Need OR
    autonomousDenialParameters-r11  SEQUENCE {
            autonomousDenialSubframes-r11    ENUMERATED {n2, n5, n10, n15,
                                                        n20, n30, spare2, spare1},
            autonomousDenialValidity-r11     ENUMERATED {
                                                        sf200, sf500, sf1000, sf2000,
                                                        spare4, spare3, spare2, spare1}
    }                           OPTIONAL    -- Need OR
    ...
}
```

If IDC interference occurs after receiving the IDC-Config IE from the eNB, the UE sends the eNB an InDeviceCoexIndication message. This message may indicate a frequency division multiplexing (FDM) or a time division multiplexing (TDM) scheme preferred by an LTE UE to avoid interference to/from Bluetooth or wireless LAN (WLAN) communication technology.

In the FDM scheme, the LTE UE reports the information on the frequency interfering to or interfered from other short range communication technologies to the eNB using a radio resource control (RRC) message (InDeviceCoexIndication). Thus, the eNB may command the LTE UE to make a handover to a frequency causing no interference.

In the TDM scheme, the eNB adjusts the DRX or HARQ process pattern to distribute interferences in time while maintaining the old serving frequency.

For example, the eNB 1220 provides the UE 1210 with configuration information such as cell measurement and DRX configuration information using the RRC Connection Reconfiguration message 1230. If it is determined that the measurement target frequencies indicated from the eNB are affected by IDC interference, the UE sends the eNB the DRX configuration information for minimizing the IDC interference using the TDM-AssistanceInfo IE of the InDeviceCoexIndication message 1240. The DRX configuration information may include a DRX cycle, an offset value for indicating the DRX start time point, and a DRX Active time.

DRX configuration information specified in LTE TS36.331 for minimizing IDC interference is illustrated in Table 4.

message may be retransmitted when at least one of the following conditions is fulfilled.

Condition 1) A set of frequencies for which a measObjectEUTRA is configured and on which an IDC problem that the UE cannot resolve occurs is different from the frequency set indicated in the last transmitted InDeviceCoexIndication message.

Condition 2) At least one frequency of the previously reported frequency set is different from the frequency indicated in the last transmitted InDeviceCoexIndication message.

Condition 3) The TDM assistance information is different from the assistance information included in the last transmitted InDeviceCoexIndication message.

Figure 13:
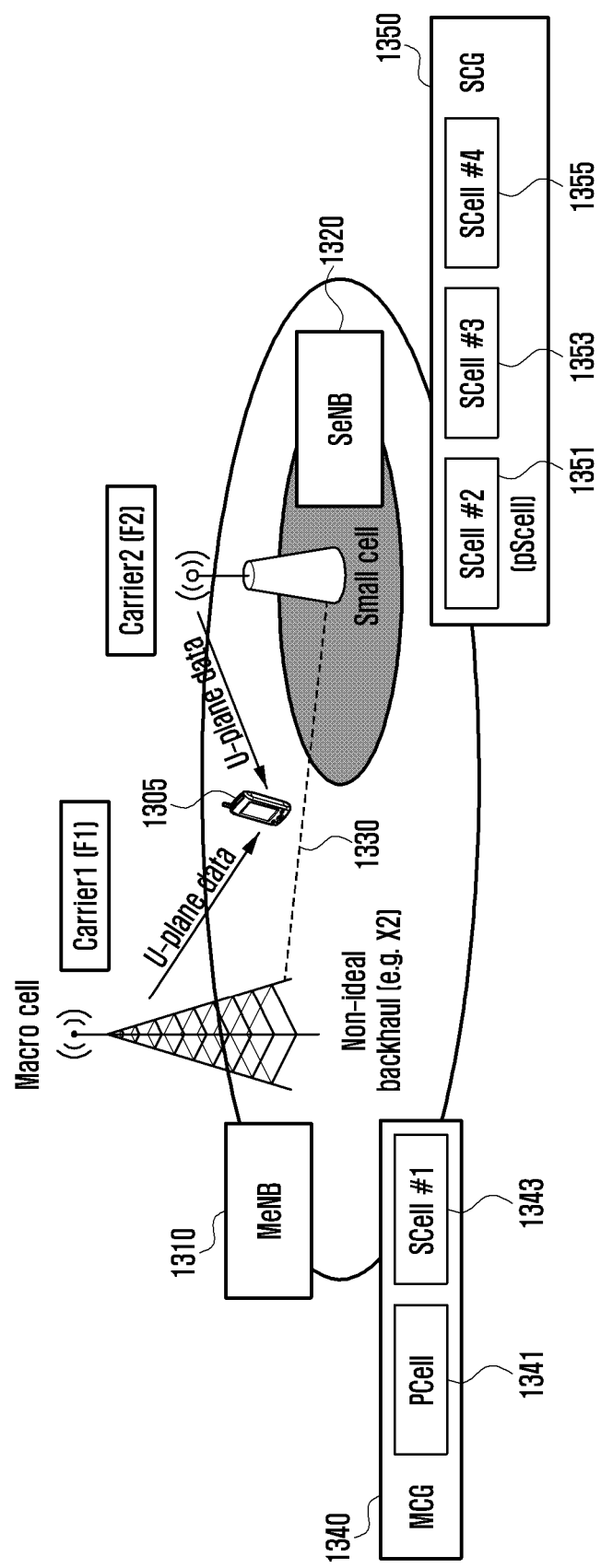
FIG. 13 is a diagram for explaining a concept of Dual Connectivity according to an embodiment of the present disclosure.

FIG. 13 is a diagram for explaining a concept of Dual Connectivity according to an embodiment of the present disclosure.

Referring to FIG. 13, a UE 1305 may connect to a macro eNB 1310 and a small cell eNB 1320 simultaneously to transmit/receive data. The macro eNB 1310 is called a master E-UTRAN Node B (MeNB), and the small cell eNB 1320 is called a secondary E-UTRAN Node B (SeNB).

There may be a plurality of small cells within the service area of the MeNB which is connected to the SeNBs through a wired backhaul network 1330, e.g., an X2 interface.

According to an embodiment of the present disclosure, the UE 1305 has a total of 5 serving cells configured by the MeNB 1310 and SeNB 1320. A set of the serving cells configured by the MeNB 1310 is referred to as a master cell group (MCG) 1340 which has a primary cell (PCell) 1341

TABLE 4

```
TDM-AssistanceInfo-r11 ::= CHOICE {
    drx-AssistanceInfo-r11       SEQUENCE {
        drx-CycleLength-r11          ENUMERATED {sf40, sf64, sf80, sf128, sf160,
                                                  sf256, spare2, spare1},
        drx-Offset-r11               INTEGER (0.. 255) OPTIONAL,
        drx-ActiveTime-r11           ENUMERATED {sf20, sf30, sf40, sf60, sf80,
                                                  sf100, spare2, spare1}
    },
    idc-SubframePatternList-r11  IDC-SubframePatternList-r11,
    ...
}
```

Here, sf40 denotes a unit of 40 subframes. Particularly, drx-Offset denotes a value indicating the DRX start time.

The drx-Offset value be defined by Equation (1).

$$[(SFN*10)+\text{subframe number}] \text{modulo}(\text{drx-CycleLength}) = \text{drx-Offset} \quad \text{Equation (1)}$$

As shown in Equation (1), a system frame number (SFN) is used to calculate the drx-Offset. SFN is a sequence of Radio Frame which has a value in the range from 0 to 1023. After one SFN cycle (01023), the SFN is initialized to 0. After its first transmission, the InDeviceCoexIndication responsible for all functions of the legacy cell such as connection establishment, connection re-establishment, and hand over. The PCell 1341 has the uplink control channel, i.e., PUCCH. The other cells are referred to as Secondary Cells (SCells) 1343. FIG. 13 shows a scenario where the MeNB 1310 configures one SCell and the SeNB 1320 configures three SCells.

A set of the serving cells configured by the SeNB 1320 is referred to as a secondary cell group (SCG) 1350. According to an embodiment of the present disclosure, the SCG 1350 includes three SCells 1351, 1353, and 1355.

When the UE 1305 transmits/receives data to/from the two eNBs, the MeNB 1310 may send the SeNB 1320 a command to add, modify, or release serving cells. In order to make such a command, the MeNB 1310 may configure the UE 1305 to measure the serving and neighboring cells. The UE 1305 reports the measurement result to the MeNB 1310 according to the configuration information.

In order for the SeNB 1320 to transmit/receive data to/from the UE 1305 efficiently, there is a need of a serving cell playing a similar role to the PCell of the MCG and, in the present disclosure, such a cell is referred to as Primary SCell (pSCell). The pSCell is selected among the serving cells of the SCG and has the uplink control channel, i.e., the UE 1305 uses the physical uplink control channel (PUCCH) to transmit the hybrid automatic repeat request (HARQ) acknowledgement (ACK)/negative acknowledgement (NACK), channel status information (CSI), and scheduling request (SR) to the eNB.

The SFN is assigned distinctly to the MCG and SCG, and the UE acquires two SFNs from the management information base (MIB) broadcast through the PCell and pSCell. In the present disclosure, the SFN applied to the MCG is referred to as MCG SFN, and the SFN applied to the SCG is referred to as SCG SFN.

A description is made of changing the DRX configuration using a fixed SFN when IDC interference occurs hereinafter.

Figure 14:
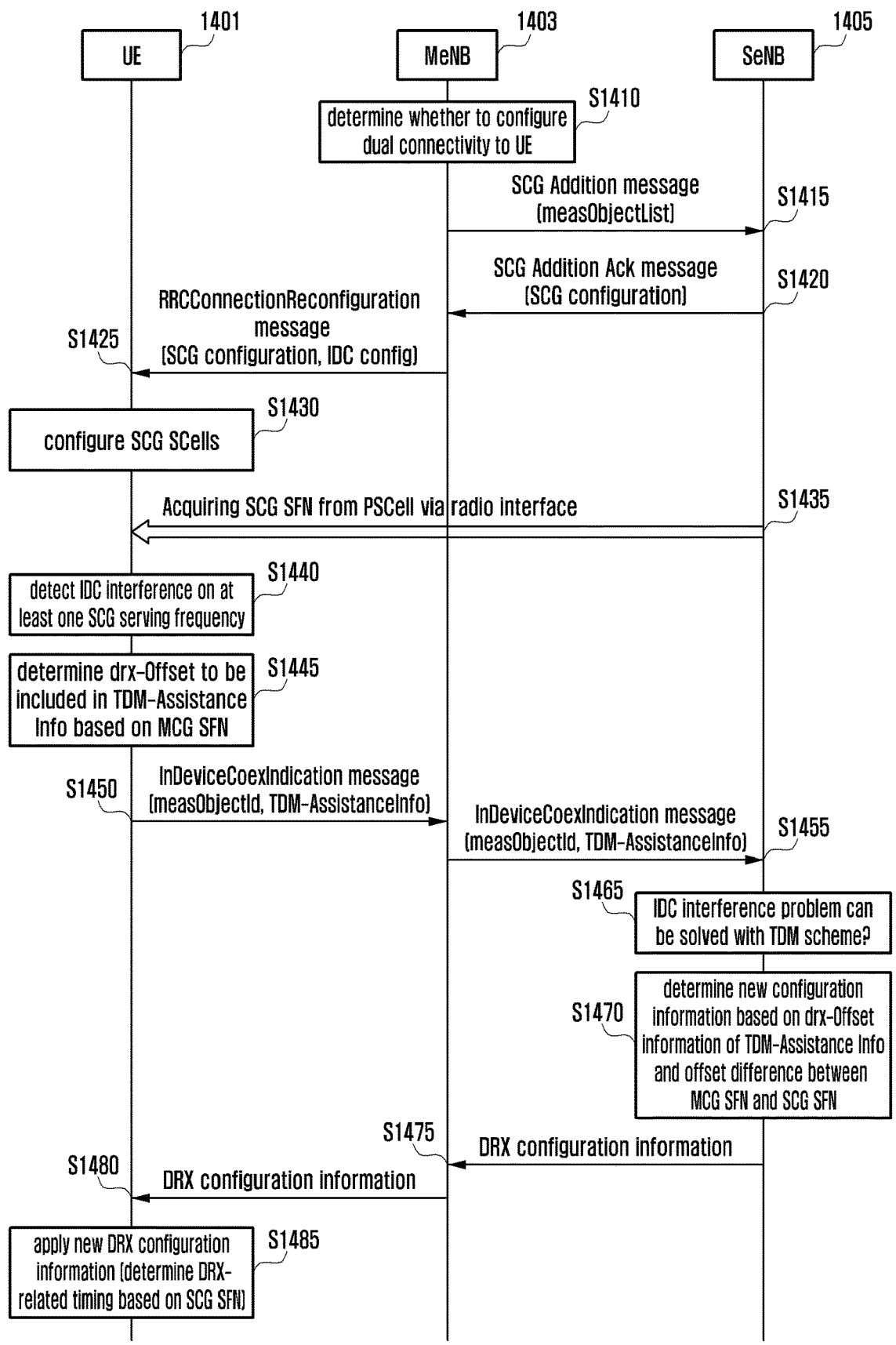
FIG. 14 is a signal flow diagram illustrating an IDC interference control procedure of a UE operating in Dual Connectivity according to an embodiment of the present disclosure.

FIG. 14 is a signal flow diagram illustrating an IDC interference control procedure of a UE operating in Dual Connectivity according to an embodiment of the present disclosure.

Referring to FIG. 14, the MeNB 1403 determines whether to configure Dual Connectivity to the UE 1401 in consideration of various factors such as UE capability, UE buffer status report (BSR), and presence/absence of the neighboring SeNB at operation S1410.

The MeNB 1403 sends an SCG addition message through the X2 interface to the SeNB 1405 that is supposed to communicate with the UE 1401 at operation S1415. The MeNB 1403 and SeNB 1405 exchange messages necessary for performing the Dual Connectivity through the X2 interface. The above message is used to request the SeNB 1405 for the Dual Connectivity to the UE 1401. In the present disclosure, the MeNB 1403 includes measObjectList in the above message.

FIG. 14 is directed to a situation where the MeNB 1403 adds an SeNB SCG. However, the present disclosure may be applicable to the SCG modification. Accordingly, the measObjectList information may be provided to the SeNB 1405 using another X2 message, e.g., SCG Modification message, instead of SCG Addition message.

The measObjectList includes the information on the measurement frequencies which the MeNB 1403 configures the UE 1401 to measure. The measObjectList may carry the information on the measurement target frequencies configured to the UE 1401 in the form of a list. The measObjectList includes frequency indices (measObjectId) and corresponding frequency information, e.g., measObjectEUTRA IE. The measObjectEUTRA includes the information on the carrier frequencies and measurement target frequency bands.

The measObjectList is used to notify the SeNB 1405 of the IDC problem occurring on a certain frequency. That is, the MeNB 1403 sends the SeNB 1405 the measObjectID to indicate the frequency on which the IDC problem has occurred. At this time, the SeNB 1405 may determine the frequency indicated by the measObjectId using the measObjectList information.

The SeNB 1405 sends the MeNB 1403 an SCG Addition ACK message in response to the SCG Addition message at operation S1420. This message includes the SCG configuration as the SCG SCell configuration information. Using the configuration, the UE 1401 may configure an SCG SCell for communication. The configuration information includes channel configuration information, transmit power information, and bearer information.

If the SCG configuration is received from the SeNB 1405, the MeNB 1403 generates the RRCConnectionReconfiguration message including the above information. If it is necessary for the UE 1401 to report the IDC problem, the MeNB 1403 includes the IDC config IE in the RRCConnectionReconfiguration message. The MeNB 1403 sends the RRCConnectionReconfiguration message to the UE 1401 at operation S1425.

If the RRCConnectionReconfiguration message is received, the UE 1401 configures the SCG SCell using the SCG configuration information included in this message at operation S1430.

The UE 1401 receives the MIB broadcast through the pSCell of the SeNB 1405 and decodes the MIB to acquire the SCG SFN at operation S1435.

The UE 1401 detects IDC interference to/from the LTE signal on at least one of configured SCG serving frequencies at operation S1440.

The UE 1401 calculates a drx-Offset to change the DRX configuration to cancel the interference at operation S1445.

As described above, the drx-Offset is used to indicate the DRX start time and is calculated using Equation (1) including the SFN value. In the present disclosure, the SFN value is replaced by the MCG SFN value. That is the UE 1401 may determine the drx-Offset value to be included in the TDM-AssistanceInfo based on the MCG SFN.

In the above equation, the SFN is used as a reference value for indicating the DRX start time point. In the Dual Connectivity mode, the UE 1401 may refer to the two SFNs, i.e., MCG SFN and SCG SFN. In order to inform which of the two values is used, it may be possible to define a new indicator to be carried in the InDeviceCoexIndication message, but this increases signaling overhead. Accordingly, it is preferred to pre-configure a fixed SFN and uses the fixed SFN.

It is possible to use a fixed SCG SFN instead of the MCG SFN. However, it is possible to simplify the calculation operation of the UE 1401 by using the MCG SFN instead of the SCG SFN. This is because the UE 1401 has to know the MCG SFN acquired from the PCell always although the Dual Connectivity technology is not applied. Accordingly, the UE 1401 determines the drx-Offset based on the MCG SFN.

The UE 1401 sends the InDeviceCoexIndication message including the above information to the MeNB 1403 at operation S1450. This message includes the information on the frequency affected by IDC interference, measObjectId and DRX configuration information, and TDM-AssistanceInfo.

The MeNB 1403 forwards the InDeviceCoexIndication message including the above information to the SeNB 1405 at operation S1455.

The SeNB 1405 determines whether it is possible to resolve the IDC interference problem with the TDM scheme. That is, the SeNB 1405 determines whether the IDC interference can be mitigated by changing the DRX configuration information based on the previously received measObjectList and IDC interference-affected frequency information at operation S1465. The SeNB 1405 may determine the frequency indicated by the measObjectID using the previously received measObjectList information. At this time, the SeNB 1405 considers that the TDM-AssistanceInfo is generated based on the MCG SFN. The SeNB 1405 also may know the offset difference between the MCG SFN and SCG SFN in advance. This can be done through a network-based solution.

If it is determined that the IDC interference can be avoided by modifying the DRX configuration information, the SeNB 1405 generates new DRX configuration information by taking both the offset differences between TDM-Assistance Info information and MCG SFN and SCG SFN into consideration at operation S1470. Since the DRX configuration information is applied to the SCG, it is generated based on the SCG SFN.

The SeNB 1405 sends the new DRX configuration information to the MeNB 1403 at operation S1475. The MeNB forwards the new DRX configuration information to the UE 1401 at operation S1480.

The UE 1401 applies the new DRX configuration on the basis of the SCG SFN at operation S1485.

Figure 15:
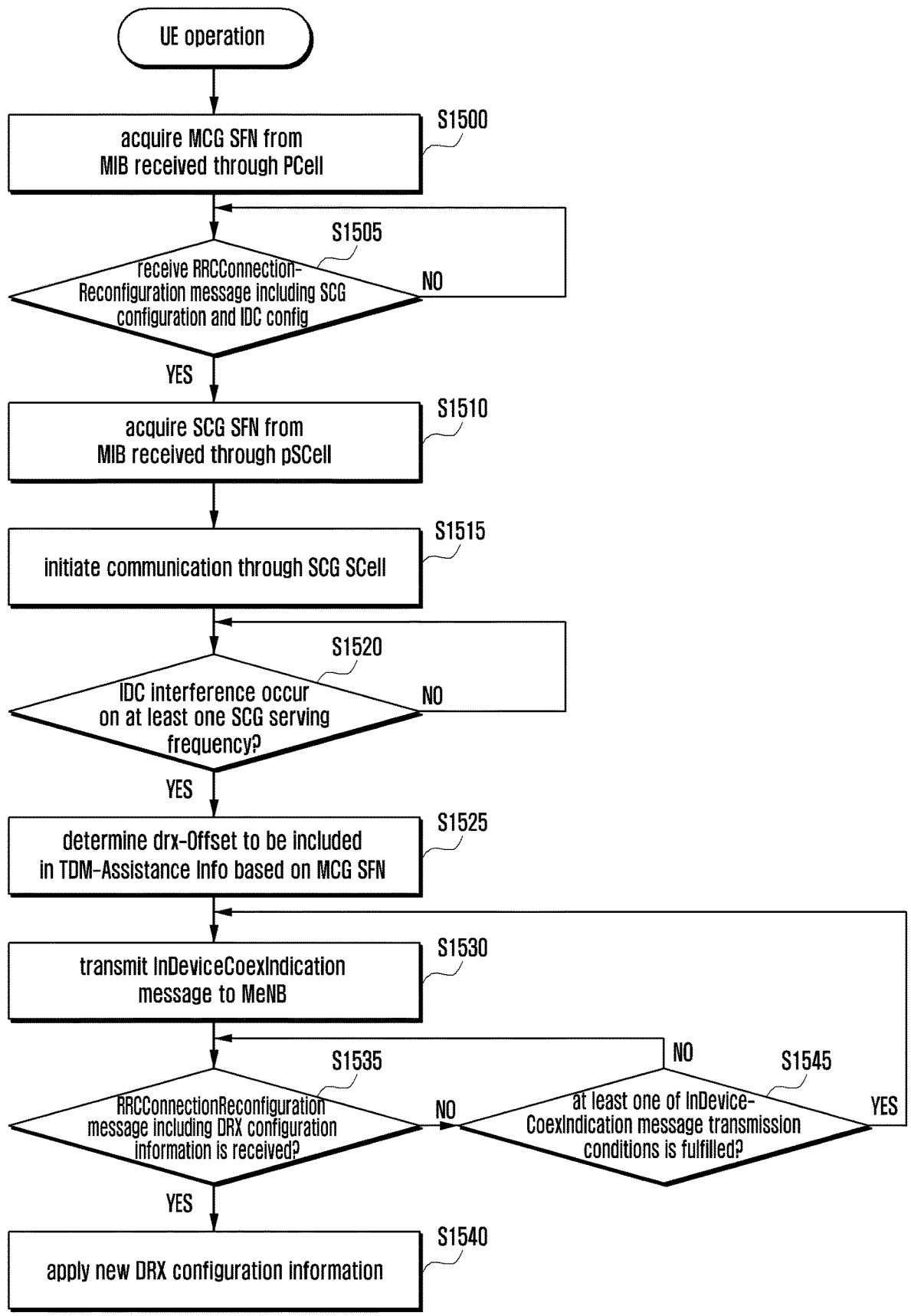
FIG. 15 is a flowchart illustrating an IDC interference control procedure of a UE according to an embodiment of the present disclosure.

FIG. 15 is a flowchart illustrating an IDC interference control procedure of a UE according to an embodiment of the present disclosure.

Referring to FIG. 15, a UE decodes an MIB broadcast through a PCell to acquire an MCG SFN for communication with an MeNB before applying Dual Connectivity at operation S1500.

The UE determines whether an RRCConnectionReconfiguration message including the SCG configuration and IDC-Config IE is received from the MeNB at operation S1505.

If the SCG configuration is received, the UE establishes a connection with the SeNB in Dual Connectivity. Since the IDC-Config IE is included, if IDC interference occurs, the UE has to report the occurrence of IDC interference to the MeNB. In order to apply the Dual Connectivity, the UE decodes the MIB broadcast through the pSCell to acquire SCG SFN at operation S1510.

The UE starts communication with the SeNB based on the SCG configuration information and SCG SFN at operation S1515.

The UE determines whether IDC interference occurs on at least one of the serving frequency of the SCG at operation S1520.

If IDC interference occurs on at least one of the serving frequency of the SCG, the UE generates the TDM-AssistanceInfo based on the MCG SFN at operation S1525. For example, the SFN information is required to derive the drx-Offset value. In order to derive drx-Offset value, SFN information is necessary. Since the UE always knows the MCG SFN received through the PCell, it can use the MCG SFN to derive the drx-Offset value. In this way, the UE can reduce signaling overhead.

The UE sends the InDeviceCoexIndication message including the configured TDM-AssistanceInfo and the measObjectId IE indicating the frequency influenced by the IDC interference to the MeNB at operation S1530.

The UE determines whether the RRCConnectionReconfiguration message including the DRX configuration is received from the MeNB at operation S1535. If so, the UE applies the new DRX configuration to cancel the IDC interference at operation S1540.

After transmitting the InDeviceCoexIndication message, if aforementioned conditions are fulfilled, e.g., the IDC interference problem occurs again or TDM scheme is changed at operation S1545, the UE returns to operation S1530 to transmit the InDeviceCoexIndication message.

Figure 16:
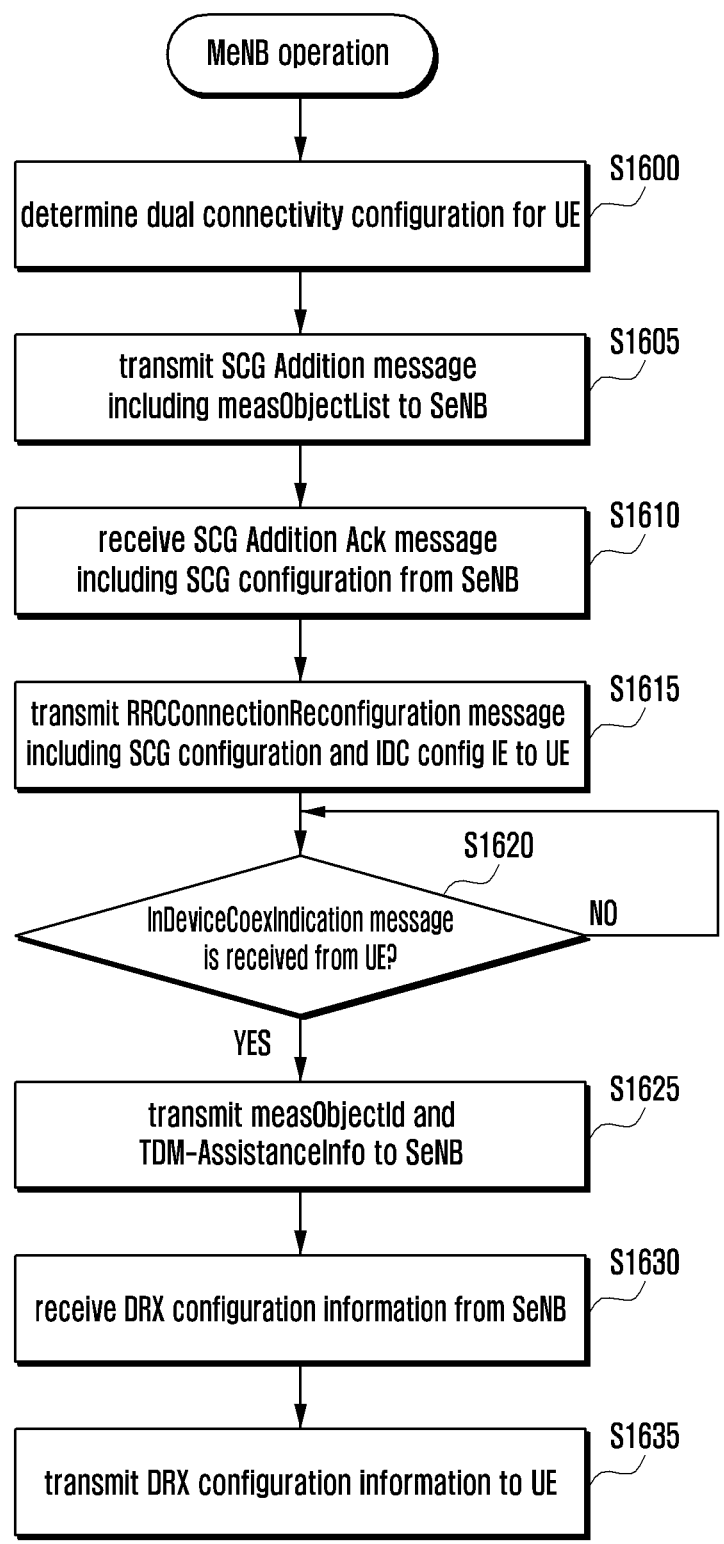
FIG. 16 is a flowchart illustrating an IDC interference control procedure of a master E-UTRAN node B (MeNB) according to an embodiment of the present disclosure.

FIG. 16 is a flowchart illustrating an IDC interference control procedure of an MeNB according to an embodiment of the present disclosure.

Referring to FIG. 16, the MeNB determines that a UE operates in the Dual Connectivity mode based on various factors at operation S1600.

The MeNB sends a neighboring SeNB, which is supposed to participate in the dual connectivity, an SCG Addition message at operation S1605. This message includes the measObjectList. This information is used to indicate the frequency influenced by the IDC interference.

The MeNB receives the SCG Addition ACK message from the SeNB at operation S1610. This message includes the SCG configuration. This information includes the information necessary for the UE to configure an SCG.

The MeNB sends the UE the RRCConnectionReconfiguration message including the SCG configuration and IDC-Config IE at operation S1615. The IDC-Config IE is included in the RRCConnectionReocnfiguration when the MeNB wants for the UE to report the occurrence of IDC interference.

The MeNB determines whether InDeviceCoexIndication message is received from the UE at operation S1620.

The MeNB forwards the measObjectId and TDM-AssistanceInfo carried in the InDeviceCoexIndication message to the SeNB at operation S1625. At this time, if it is determined that the IDC interference problem cannot be addressed based on the measObjectId and TDM-AssistanceInfo although the SeNB changes the DRX configuration information, the MeNB may not forward the above information to the SeNB. It is also possible to transmit the above information unconditionally such that the SeNB makes such a determination.

The MeNB receives new DRX configuration information from the SeNB at operation S1630. The MeNB forwards the DRX configuration information to the UE at operation S1635.

Figure 17:
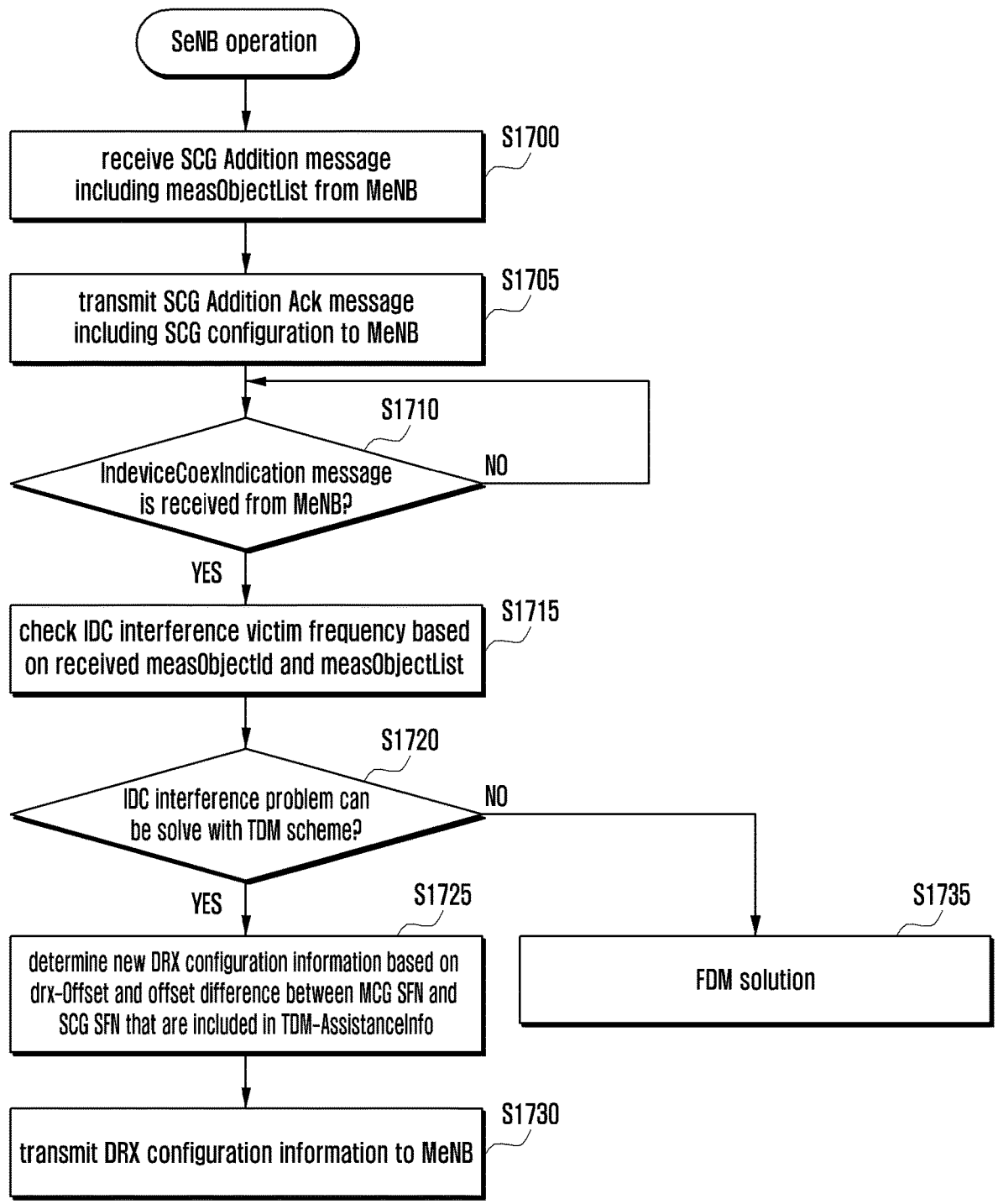
FIG. 17 is a flowchart illustrating an IDC interference control procedure of a secondary E-UTRAN Node B (SeNB) according to an embodiment of the present disclosure.

FIG. 17 is a flowchart illustrating an IDC interference control procedure of an SeNB according to an embodiment of the present disclosure.

Referring to FIG. 17, the SeNB receives an SCG Addition message from an MeNB at operation S1700. If this message includes a measObjectList, the SeNB stores the measObjectList.

The SeNB sends the MeNB an SCG Addition ACK message including the SCG configuration at operation S1705.

The SeNB determines whether the InDeviceCoexIndication information is received from the MeNB at operation S1710.

The SeNB determines the frequency being affected by the IDC interference based on the measObjectList and measObjectId of InDeviceCoexIndication information received previously at operation S1715.

The SeNB determines whether it is possible to address the IDC interference problem with the TDM scheme at operation S1720.

If it is possible to address the IDC interference problem with the TDM scheme, the SeNB generates new DRX configuration information for canceling the IDC interference based on the SCG SFN at operation S1725. In more detail, the SeNB generates new DRX configuration information based on the drx-Offset included in the TDM-AssistanceInfo and offset difference between MCG SFN and SCG SFN.

The SeNB sends the MeNB the DRX configuration information at operation S1730.

If it is impossible to address the IDC interference problem, the SeNB attempts to cancel the IDC interference with the FDM scheme at operation S1735.

Figure 18:
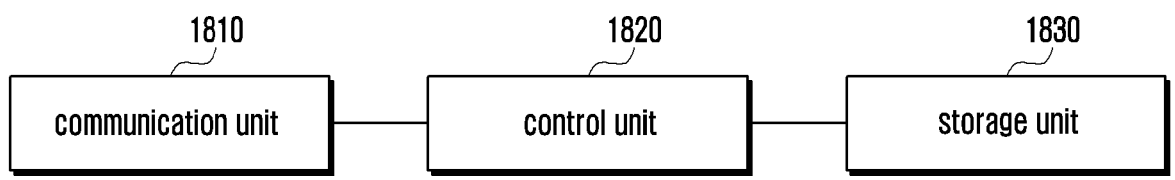
FIG. 18 is a block diagram illustrating a configuration of a UE according to an embodiment of the present disclosure.

FIG. 18 is a block diagram illustrating a configuration of a UE according to an embodiment of the present disclosure.

Referring to FIG. 18, the UE according to an embodiment of the present disclosure includes a communication unit 1810, a control unit 1820, and a storage unit 1830.

The communication unit 1810 is responsible for communication with other network entities. The communication unit 1810 may communicate with an MeNB to receive an MIB broadcast through a PCell. The communication unit 1810 may receive an SCG configuration information from the MeNB for Dual Connectivity operation.

If IDC interference is detected on a serving frequency of the SCG, the control unit 1820 computes drx-Offset to be included in the TDM-AssistanceInfo based on the MCG SFN acquired from the MIB broadcast through the PCell.

The control unit 1820 may use the MCG SFN (which may be known already) in calculating the drx-Offset so as to reduce signaling overhead.

The control unit 1820 also may configure the TDM-AssistanceInfo and send the InDeviceCoexIndication message including the measObjectId indicating the frequency affected by IDC interference to the MeNB.

If an RRCConnectionReconfiguration message is received from the MeNB after transmitting the InDeviceCoexIndication message, the UE may cancel the IDC interference by applying the new DRX configuration information included in the RRCConnectionReconfiguration message.

If no RRCConnectionReconfiguration message is received or if a condition for transmitting the InDeviceCoexIndication message is fulfilled, the UE may retransmit the InDeviceCoexIndication message to the MeNB.

The storage unit 1830 decodes the MIB broadcast through the PCell and stores the decoded MCG SFN. If it is determined that IDC interference has occurred on at least one of SCG serving frequencies, the drx-Offset is determined based on the MCG SFN stored in the storage unit 1830.

The storage unit 1830 may also store the received SCG configuration information. The storage unit 1830 may also store measObjectID as interference perpetration frequency.

Figure 19:
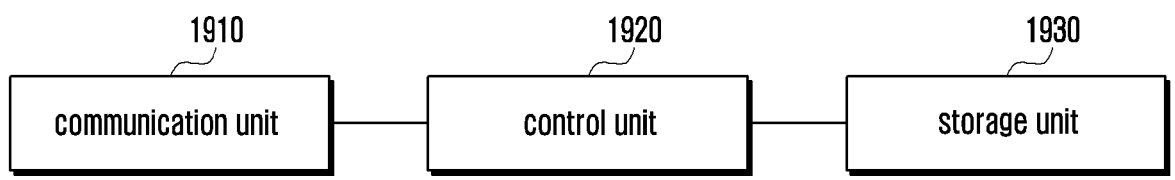
FIG. 19 is a block diagram illustrating a configuration of an MeNB according to an embodiment of the present disclosure.

FIG. 19 is a block diagram illustrating a configuration of an MeNB according to an embodiment of the present disclosure.

Referring to FIG. 19, the MeNB according to an embodiment of the present disclosure includes a communication unit 1910, a control unit 1920, and a storage unit 1930.

The communication unit 1910 is responsible for communication with other network entities. In more detail, the communication unit 1910 may determine whether to allow the UE to operate in the dual connectivity mode. The communication unit 1910 may send an SCG Addition message to an SeNB and receive a response message in reply. The communication unit 1910 may also forward the SCG configuration information received from the SeNB to a UE.

If an SCG Addition Ack message is received from the SeNB, the control unit 1920 may control to send the RRCConnectionReconfiguration message including the SCG configuration information extracted from the SCG Addition Ack message and IDC-Config IE to the UE.

If an InDeviceCoexIndication message is received from the UE, the control unit 1920 may control to send the SeNB the measObjectID and TDM-AssistanceInfo carried in the InDeviceCoexIndication message.

The control unit 1920 also may determine whether the IDC interference can be resolved with the TDM scheme based on the measObjectID and TDM-AssistenceInfo carried in the InDeviceCoexIndication message. However, the determination of whether the IDC interference can be resolved with the TDM scheme may be made by the SeNB.

If new DRX configuration information is received from the SeNB, the control unit 1920 may also control to transmit the above information to the UE.

The storage unit 1930 may store the measObjectList as the information on the cell measurement target frequency to be configured to the UE. The measObjectList may be provided in the form of a list of frequencies. The measurement target frequency information included in the measObjectList may also be comprised of measObjectID as an index and corresponding frequency information, e.g., measObjectEUTRA IE.

Figure 20:
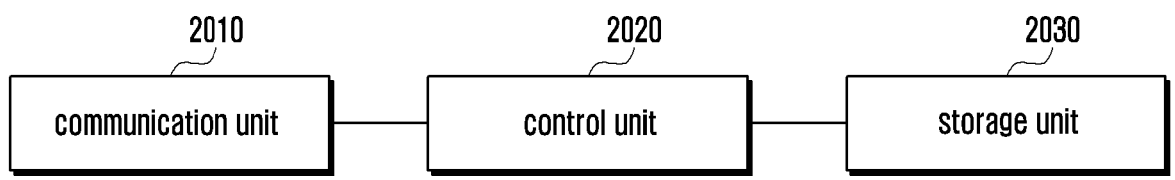
FIG. 20 is a block diagram illustrating a configuration of an (SeNB) according to an embodiment of the present disclosure.

FIG. 20 is a block diagram illustrating a configuration of an SeNB according to an embodiment of the present disclosure.

Referring to FIG. 20, the SeNB according to an embodiment of the present disclosure includes a communication unit 2010, a control unit 2020, and a storage unit 2030.

The communication unit 2010 is responsible for communication with other network entities. In more detail, the communication unit 1910 may send information necessary for the UE to operate in the dual connectivity mode to an MeNB. The communication unit 1910 may send an SCG Addition Ack message to the MeNB in response to the SCG Addition message. If IDC interference is detected, the communication unit 2010 may send the newly configured information for canceling the interference via the MeNB to the UE.

In response to the SCG Addition message received from the MeNB, the control unit 2020 may transmit an SCG Addition ACK message. At this time, the SCG Addition ACK message may include the SCG configuration message. The SCG Addition message may include the measObjectList as the UE's measurement target frequency information.

After transmitting the SCG Addition Ack message, the control unit 2020 may determine whether an InDeviceCoexIndication message is received from the MeNB. If the InDeviceCoexIndication message is received, the control unit 2020 may determine the frequency affected by interference based on the measObjectID included in the InDeviceCoexIndication message.

The control unit 2020 may determine whether the IDC interference can be resolved with the TDM scheme. If it is determined that the IDC interference can be resolved with the TDM scheme, the control unit 2020 may determine new DRX configuration information using the drx-Offset included in the TDM-AssistanceInfo, MCG SFN, and SCG SFN. The control unit 2020 may also control to transmit the DRX configuration information to the UE via the MeNB.

If the SCG Addition message received from the MeNB includes the measObjectList, the storage unit 2030 may store the measObjectList. The measObjectList may be provided in the form of a list. The measurement target frequency information included in the measObjectList may be comprised of the measObjectId as an index and the corresponding frequency information, e.g., mesObjectEUTRA IE.

The stored measObjectList can be used for determining the interference perpetration frequency.

It is to be appreciated that those skilled in the art can change or modify the above described embodiments without departing from the technical concept of this disclosure.

Accordingly, it should be understood that above-described embodiments are essentially for illustrative purpose only but not in any way for restriction thereto. Thus, the scope of the disclosure should be determined by the appended claims and their legal equivalents rather than the specification, and various alterations and modifications within the definition and scope of the claims are included in the claims.

In the above described embodiments of the present disclosure, the operations may be selectively performed or omitted. In each embodiment of the present disclosure, the operations are not necessary to be performed in the sequential order as depicted but may be performed in a changed order. Each operation may be performed independently, and each message may be transmitted independently.

Some or all of the tables exemplified in the above-description are provided to help understand the present disclosure. Accordingly, a detailed description of the table is to express part of the method and apparatus proposed in the present disclosure. That is, it is preferred to approach the content of the table of the specification semantically rather than syntactically.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been described with reference to various embodiments thereof, it will be understood by those skilled in the art that various changes in form and details may made therein without departing from the spirit and scope of the present disclosure as defined by the appended claims and their equivalents.

What is claimed is:

1. A broadcast resource congestion control method of a multi-cell/multicast coordination entity (MCE) in a wireless communication system, the method comprising:
   receiving, from a base station, a message including an identifier (ID) of a multicast broadcast signal frequency network (MBSFN) area and an overload status for each physical multicast channel (PMCH) within the MBSFN area, the PMCH being used to provide at least one multimedia broadcast and multicast service (MBMS) service;
   identifying an MBMS service per PMCH to be suspended based on the overload status; and
   transmitting, to the base station, a scheduling message indicating a system frame number (SFN) of a radio frame and an ID of the MBMS service per PMCH to be suspended.

2. The method of claim 1,
   wherein a suspension indication for the MBMS service is transmitted from the base station to a terminal,
   wherein the suspension indication is transmitted to a server, and
   wherein the overload status includes an identifier of the at least one MBMS service.

3. The method of claim 1, wherein identifying of the MBMS service per PMCH comprises:
   determining a number of terminals using each MBMS service; and
   identifying the MBMS service per PMCH to be suspended based on the determined number of terminals and the overload status.

4. The method of claim 2, wherein the suspension indication is transmitted from the base station to the terminal in a media access control (MAC) control element.

5. A broadcast resource congestion control method of a base station in a wireless communication system, the method comprising:
   transmitting, to a multi-cell/multicast coordination entity (MCE), a message including an identifier (ID) of a multicast broadcast signal frequency network (MBSFN) area and an overload status for each physical multicast channel (PMCH) within the MBSFN area, the PMCH being used to provide at least one multimedia broadcast and multicast service (MBMS) service; and
   receiving a scheduling message indicating a system frame number (SFN) of a radio frame and an ID of an MBMS service per PMCH to be suspended, the MBMS service per PMCH being identified based on the overload status.

6. The method of claim 5, further comprising:
   transmitting a suspension indication for the MBMS service to a terminal,
   wherein the suspension indication is transmitted to a server, and
   wherein the overload status includes an identifier of the at least one MBMS service.

7. The method of claim 5, wherein the MBMS service per PMCH to be suspended is identified based on a number of terminals using each MBMS service and the overload status.

8. The method of claim 6, wherein the suspension indication is transmitted from the base station to the terminal in a media access control (MAC) control element.

9. A broadcast resource congestion control method of a terminal in a wireless communication system, the method comprising:
   receiving a suspension indication for a multimedia broadcast and multicast service (MBMS) service from a base station; and
   transmitting the suspension indication to a server,
   wherein an MBMS service per physical multicast channel (PMCH) to be suspended is identified based on an overload status for each PMCH within a multicast broadcast signal frequency network (MBSFN) area, the PMCH being used to provide at least one MBMS service, and
   wherein a scheduling message indicating a system frame number (SFN) of a radio frame and an identifier (ID) of the MBMS service per PMCH to be suspended is transmitted from a multi-cell/multicast coordination entity (MCE) to the base station.

10. The method of claim 9, wherein the overload status includes an identifier of the at least one MBMS service.

11. The method of claim 9, wherein the MBMS service per PMCH to be suspended is identified based on a number of terminals using each MBMS service and the overload status.

12. The method of claim 9, wherein the suspension indication is transmitted to the terminal in a media access control (MAC) control element.

13. A multi-cell/multicast coordination entity (MCE) for controlling broadcast resource congestion in a wireless communication system, the MCE comprising:
   a transceiver; and
   at least one processor configured to:
      receive, from a base station, a message including an identifier (ID) of a multicast broadcast signal frequency network (MBSFN) area and an overload status for each physical multicast channel (PMCH) within the MBSFN area, the PMCH being used to provide at least one multimedia. broadcast and multicast service (MBMS) service,
      identify an MBMS service per PMCH to be suspended based on the overload status, and
      transmit, to the base station, a scheduling message indicating a system frame number (SFN) of a radio frame and an ID of the MBMS service per PMCH to be suspended.

14. The MCE of claim 13,
   wherein a suspension indication for the MBMS service is transmitted from the base station to a terminal, and
   wherein the suspension indication is transmitted to a server.

15. The MCE of claim 13, wherein the at least one processor is further configured to:
   determine a number of terminals using each MBMS service, and
   identify the MBMS service per PMCH to be suspended based on the determined number of terminals and the overload status.

16. The MCE of claim 14, wherein the suspension indication is transmitted from the base station to the terminal in a media access control (MAC) control element.

17. A base station for broadcast resource congestion control in a wireless communication system, the base station comprising:
   a transceiver; and
   at least one processor configured to:
      transmit, to a multi-cell/multicast coordination entity (MCE), a message including an identifier (ID) of a multicast broadcast signal frequency network (MBSFN) area and an overload status for each physical multicast Channel (PMCH) within the MBSFN area, the PMCH being used to provide at least one multimedia broadcast and multicast service (MBMS) service, and
      receive a scheduling message indicating a system frame number (SFN) of a radio frame and an ID of an MBMS service per PMCH to be suspended, the MBMS service per PMCH being identified based on the overload status.

18. The base station of claim 17,
   wherein the at least one processor is further configured to transmit a suspension indication for the MBMS service to a terminal,
   wherein the suspension indication is transmitted from the terminal to a server, and
   wherein the overload status includes an identifier of the at least one MBMS service.

19. The base station of claim 17, wherein the MBMS service per PMCH to be suspended is identified based on a number of terminals using each MBMS service and the overload status.

20. The base station of claim 18, wherein the suspension indication is transmitted from the base station to the terminal in a media access control (MAC) control element.

21. A terminal for broadcast resource congestion control in a wireless communication system, the terminal comprising:
   a transceiver; and
   least one processor configured to:
      receive a suspension indication for a multimedia broadcast and multicast service (MBMS) service from a base station, and
      transmit the suspension indication to a server,
   wherein an MBMS service per physical multicast channel (PMCH) to be suspended is identified based on an overload status for each PMCH within a multicast broadcast signal frequency network (MBSFN) area, the PMCH being used to provide at least one MBMS service, and
   wherein a scheduling message indicating a system frame number (SFN) of a radio frame indicating that MBMS is to be suspended and an identifier (ID) of the MBMS service per PMCH to he suspended is transmitted from a multi-cell/multicast coordination entity (MCE) to the base station.

22. The terminal of claim 21,
   wherein the overload status includes an identifier of the at least one MBMS service.

23. The terminal of claim 21, wherein the MBMS service per PMCH to be suspended is identified based on a number of terminals using each MBMS service and the overload status.

24. The terminal of claim 22, wherein the suspension indication is transmitted to the terminal in a media access control (MAC) control element.

* * * * *